US012797901B2

(12) United States Patent
Kubo et al.

(10) Patent No.: US 12,797,901 B2
(45) Date of Patent: Nov. 17, 2026

(54) METHOD FOR FORMING MULTILAYER COATING FILM

(71) Applicant: KANSAI PAINT CO., LTD., Hyogo (JP)

(72) Inventors: Kentaro Kubo, Miyoshi (JP); Masahiro Omura, Miyoshi (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 18/834,162

(22) PCT Filed: Jan. 23, 2023

(86) PCT No.: PCT/JP2023/001932
§ 371 (c)(1),
(2) Date: Jul. 29, 2024

(87) PCT Pub. No.: WO2023/149263
PCT Pub. Date: Aug. 10, 2023

(65) Prior Publication Data

US 2025/0222491 A1 Jul. 10, 2025

(30) Foreign Application Priority Data

Feb. 2, 2022 (JP) ................................ 2022-015250

(51) Int. Cl.
*B05D 7/00* (2006.01)
*B05D 1/04* (2006.01)
*B05D 3/02* (2006.01)
*B05D 5/06* (2006.01)

(52) U.S. Cl.
CPC ............... *B05D 7/577* (2013.01); *B05D 1/04* (2013.01); *B05D 3/0254* (2013.01); *B05D 5/068* (2013.01); *B05D 2202/15* (2013.01); *B05D 2401/20* (2013.01); *B05D 2451/00* (2013.01); *B05D 2502/00* (2013.01)

(58) Field of Classification Search
CPC .......... B05D 1/04; B05D 1/36; B05D 3/0254; B05D 3/577; B05D 5/066; B05D 5/068; B05D 2205/15; B05D 2401/10; B05D 2401/20; B05D 2451/00; B05D 2502/00; B05D 2601/04; B05D 2601/08
See application file for complete search history.

(56) References Cited

U.S. PATENT DOCUMENTS

| | | | | |
|---|---|---|---|---|
| 8,758,896 B2 * | 6/2014 | Imanaka | ............ | C08G 18/6659 428/411.1 |
| 9,017,768 B2 | 4/2015 | Tomizaki et al. | | |
| 2011/0300389 A1 | 12/2011 | Kitagawa et al. | | |
| 2015/0064476 A1 | 3/2015 | Kanda | | |
| 2019/0001370 A1 * | 1/2019 | Itoh | ...................... | C09D 201/00 |
| 2021/0039136 A1 | 2/2021 | Nishimura | | |

FOREIGN PATENT DOCUMENTS

| | | | |
|---|---|---|---|
| CA | 2741414 | A1 | 4/2010 |
| JP | 2004-351389 | A | 12/2004 |
| JP | 2004-351390 | A | 12/2004 |
| JP | 2013-27820 | A | 2/2013 |
| JP | 2021-41397 | A | 3/2021 |
| WO | WO-2009/013853 | A1 | 1/2009 |
| WO | WO-2010/095541 | A1 | 8/2010 |
| WO | WO-2013/151050 | A1 | 10/2013 |
| WO | WO-2020/137360 | A1 | 7/2020 |

OTHER PUBLICATIONS

English-language translation of the Written Opinion of the International Searching Authority in PCT/JP2023/001932, Apr. 11, 2023, 4 pages. (Year: 2023).*
International Search Report, corresponding International Application No. PCT/JP2023/001932, mailing date Apr. 11, 2023.

* cited by examiner

*Primary Examiner* — William P Fletcher, III
(74) *Attorney, Agent, or Firm* — MARSHALL, GERSTEIN & BORUN LLP

(57) ABSTRACT

A method for forming a multilayer coating film having metallic mottling resistance includes: (1) applying a first aqueous coating material (P1) on an object to be coated to form a first coating film; (2) applying a second aqueous colored coating material (P2) on the first coating film to form a second colored coating film that contains a binder component ($A_{P2}$) and lustrous pigment ($B_{P2}$); (3) applying a clear-coat coating material (P3) on the second colored coating film to form a clear-coat coating film resulting in a multilayer coating film; and (4) heating the multilayer coating film so as to cure the multilayer coating film all at once. The first aqueous coating material (P1) contains a compound (A) containing a hydroxyl group and an acid group and that has an acid value of from 50 to 150 mg KOH/g, a hydroxyl value of from 100 to 300 mg KOH/g, and a weight-average molecular weight of from 500 to 8000, a film-forming resin (B), and a crosslinking agent (C).

9 Claims, No Drawings

METHOD FOR FORMING MULTILAYER COATING FILM

TECHNICAL FIELD

The present invention relates to a method for forming a multilayer coating film.

BACKGROUND ART

As a method for forming a coating film on an automobile body, there has been widely employed a method for forming a multilayer coating film by applying an electrodeposition paint to an object to be coated to form an electrodeposition coating film, baking and curing the electrodeposition coating film, and then performing the following three coat two bake (3C2B) method.

(i) Apply an intermediate paint onto a cured electrodeposition coating film to form an intermediate coating film.
(ii) Bake to cure the intermediate coating film.
(iii) Apply a base paint onto the cured intermediate coating film to form a base coating film.
(iv) Preheat the base coating film.
(v) Apply a clear paint onto the base coating film to form a clear coating film.
(vi) Bake to cure the base coating film and the clear coating film.

In recent years, from the perspective of energy saving, a method has been studied for forming a multilayer coating film by applying an electrodeposition paint to an object to be coated to form an electrodeposition coating film, baking and curing the electrodeposition coating film, and then performing the following three coat one bake (3C1B) method.

(i) Apply an intermediate paint onto a cured electrodeposition coating film to form an intermediate coating film.
(ii) Preheat the intermediate coating film as necessary.
(iii) Apply a base paint onto the intermediate coating film to form a base coating film.
(iv) Preheat the base coating film.
(v) Apply a clear paint onto the base coating film to form a clear coating film.
(vi) Bake the intermediate coating film, the base coating film, and the clear coating film to cure them.

Furthermore, multilayer coating films of light interference paint colors such as metallic paint colors, mica paint colors, and pearl paint colors are typically formed using, as top coating paints, a base paint that includes an effect pigment for providing a high level of brightness, and a transparent clear paint. Note that a coating film having high brightness generally has a significant change in lightness due to the angle of observation when the coating film is observed as the angle is changed, and further is a coating film in which the effect pigment is present relatively homogeneously in the coating film, and almost no metallic unevenness is observed. Furthermore, as described above, when the change in lightness due to the angle of observation is significant, the flip-flop property is generally high.

As effect pigments, ordinarily aluminum flake pigments with metallic luster are used in the case of metallic paint colors, and light interference pigments such as mica pigments coated with a metal oxide and aluminum oxide pigments coated with a metal oxide are used in the case of light interference paint colors. Ordinarily, multilayer coating films of these paint colors are formed by sequentially applying an effect pigment-containing base paint and a clear paint in a wet-on-wet manner onto an intermediate coating film that has been baked, and subsequently curing the obtained uncured coating film in a single baking process.

However, when a multilayer coating film of a metallic paint color, a light interference paint color, or the like is formed in a wet-on-wet manner, the orientation of the effect pigment contained in the base paint becomes disordered, resulting in an issue of a decrease in brightness.

Also, in recent years, the use of water-based paints has been increasing from the perspective of reducing environmental burden. However, with water-based paints, the volatilization rate of water, which is the diluting solvent, is slow, and the volatilization rate is greatly impacted by the application environment conditions such as temperature and humidity. Therefore, in the case of wet-on-wet coating with a water-based paint, the orientation of the effect pigment is more easily disordered compared to a case in which an organic solvent-based paint is used, and as a result, the decrease in brightness becomes more pronounced.

Various methods have been proposed in the past to solve the above issues.

For example, Patent Document 1 and Patent Document 2 disclose methods for forming an effect coating film, the methods including applying a water-based first base effect paint onto an intermediate coating film to form an uncured first base coating film, applying a water-based second base effect paint onto the uncured first base coating film to form an uncured second base coating film, applying a clear paint onto the uncured second base coating film to form a clear coating film, and heating and curing the uncured first base coating film, second base coating film, and clear coating film all at once. These documents also describe that, in the methods described above, the paint solid content in the water-based first base effect paint and the water-based second base effect paint and the concentration of the effect pigment are adjusted, and thereby a metallic appearance free of brightness unevenness is exhibited with, for example, an aluminum flake pigment having metallic luster, and furthermore, an effect coating film that manifests an extremely high flip-flop property can be obtained with, for example, a mica pigment having interference properties.

CITATION LIST

Patent Document

Patent Document 1: JP 2004-351389 A
Patent Document 2: JP 2004-351390 A

SUMMARY OF INVENTION

Technical Problem

However, there has been an issue that metallic unevenness tends to occur in a multilayer coating film to be formed when an uncured first coating film is formed by applying a first water-based paint onto an object to be coated, and then a second coloring water-based paint having a relatively low paint solid content is applied onto the uncured first coating film. In addition, the metallic unevenness tends to occur when the first water-based paint is applied in a relatively low-humidity environment.

The metallic unevenness tends to occur when two types of base paints including a water-based first base paint and a water-based second base paint are used as base paints in the three coat one bake (3C1B) method, the first water-based paint is applied as the water-based first base paint to form an uncured first coating film, and then the second coloring water-based paint having a relatively low paint solid content is applied as the water-based second base paint to the uncured first coating film.

An object of the present invention is to provide a method for forming a multilayer coating film capable of forming a multilayer coating film excellent in metallic unevenness resistance, the method including curing a multilayer coating film including the three layers of a first coating film, a second coloring coating film, and a clear coat coating film at one time.

Solution to Problem

The inventors of the present invention have found a method for forming a multilayer coating film, the method including the following steps (1) to (4): (1) forming a first coating film having a cured film thickness ($T_{P1}$) in a range of from 5 to 20 μm by applying a first water-based paint (P1) onto an object to be coated; (2) forming a second coloring coating film having a cured film thickness ($T_{P2}$) in a range of from 0.5 to 7 μm by applying a second water-based coloring paint (P2) onto the first coating film, the second water-based coloring paint (P2) containing a binder component ($A_{P2}$) and an effect pigment ($B_{P2}$) and having a paint solid content concentration ($NV_{P2}$) in a range of 1 mass % or more and less than 20 mass %; (3) forming a clear coat coating film by applying a clear coat paint (P3) onto the second coloring coating film; and (4) curing a multilayer coating film including the first coating film, the second coloring coating film, and the clear coat coating film formed in the steps (1) to (3) at one time by heating the multilayer coating film, wherein the first water-based paint (P1) contains a compound (A) containing a hydroxyl group and an acid group, a film-forming resin (B), and a crosslinking agent (C), the compound (A) containing a hydroxyl group and an acid group having an acid value in a range of from 50 to 150 mg KOH/g, a hydroxyl value in a range of from 100 to 300 mg KOH/g, and a weight average molecular weight in a range of from 500 to 8000.

Advantageous Effects of Invention

The method for forming a multilayer coating film according to the present invention, which includes curing a multilayer coating film including the three layers of a first coating film, a second coloring coating film, and a clear coat coating film at one time, can form a multilayer coating film excellent in metallic unevenness resistance. The method for forming a multilayer coating film according to the present invention can form a multilayer coating film excellent in metallic unevenness resistance even when the first coating film is formed by applying a first water-based paint in a relatively low-humidity environment.

DESCRIPTION OF EMBODIMENTS

Specifically, the present invention relates to the following aspects.

Aspect 1

A method for forming a multilayer coating film, the method including the following steps (1) to (4):

(1) forming a first coating film having a cured film thickness ($T_{P1}$) in a range of from 5 to 20 μm by applying a first water-based paint (P1) onto an object to be coated;

(2) forming a second coloring coating film having a cured film thickness (TP2) in a range of from 0.5 to 7 μm by applying a second water-based coloring paint (P2) onto the first coating film, the second water-based coloring paint (P2) containing a binder component ($A_{P2}$) and an effect pigment ($B_{P2}$) and having a paint solid content concentration ($NV_{P2}$) in a range of 1 mass % or more and less than 20 mass %;

(3) forming a clear coat coating film by applying a clear coat paint (P3) onto the second coloring coating film; and (4) curing the multilayer coating film including the first coating film, the second coloring coating film, and the clear coat coating film formed in the steps (1) to (3) at one time by heating the multilayer coating film, wherein the first water-based paint (P1) contains a compound (A) containing a hydroxyl group and an acid group, a film-forming resin (B), and a crosslinking agent (C), the compound (A) containing a hydroxyl group and an acid group having an acid value in a range of from 50 to 150 mg KOH/g, a hydroxyl value in a range of from 100 to 300 mg KOH/g, and a weight average molecular weight in a range of from 500 to 8000.

Aspect 2

The method for forming the multilayer coating film according to Aspect 1, wherein the object to be coated is a steel sheet on which a cured electrodeposited coating film is formed, on which an intermediate coating paint is applied to form an intermediate coating film.

Aspect 3

The method for forming the multilayer coating film according to Aspect 1 or 2, wherein the intermediate paint is a water-based paint.

Aspect 4

The method for forming the multilayer coating film according to Aspect 1 or 2, wherein the intermediate paint has a cured film thickness in a range of from 15 to 40 μm.

Aspect 5

The method for forming the multilayer coating film according to any one of Aspects 1 to 3, wherein the compound (A) containing the hydroxyl group and the acid group contains a carboxyl group as the acid group.

Aspect 6

The method for forming the multilayer coating film according to any one of Aspects 1 to 4, wherein the compound (A) containing the hydroxyl group and the acid group contains an acrylic resin (A1) containing a hydroxyl group and an acid group, the acrylic resin (A1) containing a hydroxyl group and an acid group having an acid value in a range of from 50 to 140 mg KOH/g, a hydroxyl value in a range of from 100 to 300 mg KOH/g, and a weight average molecular weight in a range of from 500 to 8000.

Aspect 7

The method for forming the multilayer coating film according to Aspect 5, wherein the acrylic resin (A1) containing the hydroxyl group and the acid group has the weight average molecular weight in a range of from 1000 to 8000.

Aspect 8

The method for forming the multilayer coating film according to any one of Aspects 1 to 7, wherein the second water-based coloring paint (P2) contains the effect pigment ($B_{P2}$) in an amount ranging from 5 to 550 parts by mass based on 100 parts by mass of a solid content of the binder component ($A_{P2}$).

Aspect 9

The method for forming the multilayer coating film according to any one of Aspects 1 to 8, wherein the second water-based coloring paint (P2) contains the effect pigment ($B_{P2}$) in an amount ranging from 4 to 85 mass % based on a paint solid content in the second water-based coloring paint (P2).

Aspect 10

The method for forming the multilayer coating film according to any one of Aspects 1 to 9, wherein the multilayer coating film has an L*25 value in a range of from 75 to 120.

Hereinafter, a method for forming a multilayer coating film according to the present invention will be described in detail.

The method for forming a multilayer coating film of the present invention includes the following steps:

(1) a step of forming a first coating film having a cured film thickness ($T_{P1}$) in a range of from 5 to 20 μm by applying a first water-based paint (P1) onto a cured intermediate coating film that has been formed by applying an intermediate paint onto an object to be coated (hereinafter, the step may be referred to as "(1) first coating film forming step");

(2) a step of forming a second coloring coating film having a cured film thickness ($T_{P2}$) in a range of from 0.5 to 7 μm by applying a second water-based coloring paint (P2) onto the first coating film, the second water-based coloring paint (P2) containing a binder component ($A_{P2}$) and an effect pigment ($B_{P2}$) and having a paint solid content concentration ($NV_{P2}$) in a range of 1 mass % or more and less than 20 mass % (hereinafter, the step may be referred to as "(2) second coloring coating film forming step");

(3) a step of forming a clear coat coating film by applying a clear coat paint (P3) on the second coloring coating film (hereinafter, the step may be referred to as "(3) clear coat coating film forming step");

(4) a step of curing a multilayer coating film including the first coating film, the second coloring coating film, and the clear coat coating film formed in the steps (1) to (3) at one time by heating the multilayer coating film (hereinafter, the step may be referred to as "(4) multilayer coating film curing step").

The method for forming a multilayer coating film according to the present invention may include the following steps before the (1) first coating film forming step:

(1a) a step of forming an electrodeposition coating film by applying an electrodeposition paint onto a steel sheet, and forming a cured electrodeposition coating film by heating and curing the electrodeposition coating film (hereinafter, the step may be referred to as "(1a) electrodeposition coating film forming step");

(1b) a step of forming an intermediate coating film by applying an intermediate paint onto the electrodeposition coating film (hereinafter, the step may be referred to as "(1b) intermediate coating film forming step").

[(1) First Coating Film Forming Step]

In (1) first coating film forming step, a first water-based paint (P1) is applied onto an object to be coated to form a first coating film having a cured film thickness ($T_{P1}$) in a range of from 5 to 20 μm.

The first water-based paint (P1) contains a compound (A) containing a hydroxyl group and an acid group and having an acid value in a range of from 50 to 150 mg KOH/g, a hydroxyl value in a range of from 100 to 300 mg KOH/g, and a weight average molecular weight in a range of from 500 to 8000, a film-forming resin (B), and a crosslinking agent (C).

[Object to be Coated]

The object to be coated to which the method for forming a multilayer coating film of the present invention is applied is not particularly limited. Examples of the object to be coated include outer panel parts of automobile bodies, such as those of passenger cars, trucks, motorcycles, and buses; automobile parts such as bumpers; outer panel parts of home electrical appliances, such as mobile phones and audio devices. Of these, outer panel parts of automobile bodies and automobile parts are preferred, and outer panel parts of automobile bodies are particularly preferred.

Materials of the objects to be coated are not particularly limited. Examples of the material include: metal materials, such as iron, aluminum, brass, copper, tin plates, stainless steel, galvanized steel, and zinc alloy (such as Zn—Al, Zn—Ni, and Zn—Fe)-plated steel; resin materials, such as polyethylene resins, polypropylene resins, acrylonitrile-butadiene-styrene (ABS) resins, polyamide resins, acrylic resins, vinylidene chloride resins, polycarbonate resins, polyurethane resins, epoxy resins, mixtures of these resins, and various fiber-reinforced plastics (FRP); inorganic materials, such as glass, cement, and concrete; woods; and fiber materials, such as paper and cloth. Of these, a metal material and a resin material are preferred. The object to be coated may be a combination of the metal material and the resin material.

The object to be coated may be one subjected to surface treatment, such as phosphate treatment, chromate treatment, or composite oxide treatment, on the metal materials or metal surfaces of an automobile body or the like formed from the metal materials. The object to be coated may be the resin material or an automobile part or the like molded from the resin material with a coating film formed on the resin surface.

Examples of the object to be coated on which a coating film is formed include an object obtained by subjecting a substrate to surface treatment as necessary and forming an undercoat coating film thereon. The undercoat coating film is usually formed for the purpose of imparting corrosion resistance, adhesion to the substrate, a property of concealing irregularities on the substrate surface (may be referred to as "substrate concealing property"), and the like. As the undercoat paint used for forming the undercoat coating film, those known per se can be used.

As the object to be coated, there can be used, for example, an object to be coated obtained by applying an electrodeposition paint onto a steel sheet as a substrate and thermally curing the paint to form a cured electrodeposition coating film. Coating the surface of the steel sheet as base material with the electrodeposition paint makes it possible to prevent rust and corrosion on the steel sheet. For this reason, it is preferable to use, as the object to be coated, an object to be coated obtained by applying an electrodeposition paint onto a steel sheet as the substrate and thermally curing the coating composition to form a cured electrodeposition coating film.

As the object to be coated, an object in which an intermediate coating film is formed by further applying an intermediate paint on the cured electrodeposition coating film obtained in the electrodeposition coating film forming step may be used. Further forming an intermediate coating film on the cured electrodeposition coating film makes it possible to form a multilayer coating film excellent in impact resistance, smoothness and the like. Therefore, it is preferable to use, as the object to be coated, an object in which an intermediate coating film is further formed on the cured electrodeposition coating film.

<Compound (A)>

The compound (A) is not particularly limited as long as it has an acid value in a range of from 50 to 150 mg KOH/g, a hydroxyl value in a range of from 100 to 300 mg KOH/g, and a weight average molecular weight in a range of from 500 to 8000, and examples thereof include acrylic resins, polyester resins, alkyd resins, and urethane resins containing a hydroxyl group and an acid group. The compound (A) is preferably an acrylic resin (A1) containing a hydroxyl group and an acid group and having an acid value in a range of from 50 to 150 mg KOH/g, a hydroxyl value in a range of from 100 to 300 mg KOH/g, and a weight average molecular weight in a range of from 500 to 8000.

<Acrylic Resin (A1) Containing Hydroxyl Group and Acid Group>

The acrylic resin (A1) containing a hydroxyl group and an acid group has an acid value in a range of from 50 to 140 mg KOH/g, a hydroxyl value in a range of from 100 to 300 mg KOH/g, and a weight average molecular weight in a range of from 500 to 8000.

The acrylic resin (A1) containing a hydroxyl group and an acid group can be usually produced by copolymerizing a hydroxyl group-containing polymerizable unsaturated monomer (a), an acid group-containing polymerizable unsaturated monomer (b), and additional polymerizable unsaturated monomer (c) copolymerizable with the hydroxyl group-containing polymerizable unsaturated monomer (a) and the acid group-containing polymerizable unsaturated monomer (b). The polymerization method is not particularly limited, and a polymerization method known per se can be used. In particular, a solution polymerization method in which polymerization is performed in an organic solvent in the presence of a polymerization initiator can be suitably used.

The hydroxyl group-containing polymerizable unsaturated monomer (a) is a compound having at least one hydroxyl group and at least one polymerizable unsaturated group per molecule, and examples include monoesterified products of a $C_{2-8}$ dihydric alcohol and a (meth)acrylic acid, such as 2-hydroxyethyl (meth)acrylate, 2-hydroxypropyl (meth)acrylate, 3-hydroxypropyl (meth)acrylate, and 4-hydroxybutyl (meth)acrylate; ε-caprolactone modified products of these monoesterified products; N-hydroxymethyl (meth)acrylamides; allyl alcohols; and (meth)acrylates having a polyoxyethylene chain with a hydroxyl group at the molecular terminal.

However, in the present invention, a monomer corresponding to ($c_{13}$) a polymerizable unsaturated monomer having an ultraviolet absorbing functional group described later should be defined as "additional polymerizable unsaturated monomer (c) copolymerizable with the hydroxyl group-containing polymerizable unsaturated monomer (a) and the acid group-containing polymerizable unsaturated monomer (b)", and is excluded from the "hydroxyl group-containing polymerizable unsaturated monomer (a)". One type of hydroxyl group-containing polymerizable unsaturated monomer (a) can be used alone or two or more types may be combined and used.

In the present specification, a polymerizable unsaturated group means an unsaturated group that is radically polymerizable. Examples of such polymerizable unsaturated groups include a vinyl group, a (meth)acryloyl group, a (meth)acrylamide group, a vinyl ether group, an allyl group, a propenyl group, an isopropenyl group, and a maleimide group.

In the present specification, "(meth)acrylate" means an acrylate and/or a methacrylate, and "(meth)acrylic acid" means acrylic acid and/or methacrylic acid. "(Meth)acryloyl" means acryloyl and/or methacryloyl. "(Meth)acrylamide" means acrylamide and/or methacrylamide.

Examples of the acid group-containing polymerizable unsaturated monomer (b) include the following monomers:

($b_1$) carboxyl group-containing polymerizable unsaturated monomers, such as (meth)acrylic acid, maleic acid, crotonic acid, and β-carboxyethyl acrylate;

($b_2$) polymerizable unsaturated monomers having a sulfonic acid group, such as 2-acrylamido-2-methylpropane sulfonic acid, 2-sulfoethyl (meth)acrylate, allyl sulfonic acid, 4-styrene sulfonic acid, and the like, and sodium salts and ammonium salts of these sulfonic acids;

($b_3$) polymerizable unsaturated monomers having a phosphate group: such as acid phosphoxyethyl (meth)acrylate, acid phosphoxypropyl (meth)acrylate, acid phosphoxypoly(oxyethylene)glycol (meth)acrylate, and acid phosphoxypoly(oxypropylene)glycol (meth)acrylate.

As the acid group-containing polymerizable unsaturated monomer (b), "($b_1$) carboxyl group-containing polymerizable unsaturated monomer" is preferable from the perspective of suppressing metallic unevenness and improving water resistance of the multilayer coating film to be formed.

The additional polymerizable unsaturated monomer (c) copolymerizable with the hydroxyl group-containing polymerizable unsaturated monomer (a) and the acid group-containing polymerizable unsaturated monomer (b) can be appropriately selected according to the properties desired for the acrylic resin (A1) containing a hydroxyl group and an acid group. Examples of the additional copolymerizable polymerizable unsaturated monomer (c) includes the followings used alone or in a combination of two or more:

($c_1$) alkyl or cycloalkyl (meth)acrylates, for example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth) acrylate, 2-ethylhexyl (meth)acrylate, nonyl (meth) acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, tert-butylcyclohexyl (meth)acrylate, cyclododecyl (meth)acrylate, and tricyclodecanyl (meth)acrylate;

($c_2$) polymerizable unsaturated monomers having an isobornyl group, for example, isobornyl (meth)acrylate;

($c_3$) polymerizable unsaturated monomers having an adamantyl group, for example, adamantyl (meth)acrylate;

($c_4$) polymerizable unsaturated monomers having a tricyclodecenyl group, for example, tricyclodecenyl (meth) acrylate;

($c_5$) aromatic ring-containing polymerizable unsaturated monomers, for example, benzyl (meth)acrylate, styrene, α-methylstyrene, and vinyltoluene;

($c_6$) polymerizable unsaturated monomers having an alkoxysilyl group, for example, vinyltrimethoxysilane, vinyltriethoxysilane, vinyltris(2-methoxyethoxy)silane, γ-(meth)acryloyloxypropyltrimethoxysilane, and γ-(meth)acryloyloxypropyltriethoxysilane;

($c_7$) polymerizable unsaturated monomers having a fluorinated alkyl group, for example, perfluoroalkyl (meth) acrylates such as perfluorobutylethyl (meth)acrylate and perfluorooctylethyl (meth)acrylate; and fluoroolefins;

($c_8$) vinyl compounds, for example, N-vinylpyrrolidone, ethylene, butadiene, chloroprene, vinyl propionate, and vinyl acetate;

($c_9$) nitrogen-containing polymerizable unsaturated monomers, for example, (meth)acrylonitrile, (meth) acrylamide, N,N-dimethylaminoethyl (meth)acrylate, N,N-diethylaminoethyl (meth)acrylate, N,N-dimethylaminopropyl (meth)acrylamide, methylene bis(meth) acrylamide, ethylene bis(meth)acrylamide, 2-(methacryloyloxy)ethyltrimethylammonium chloride, and an adduct of glycidyl (meth)acrylate and an amine;

($c_{10}$) polymerizable unsaturated monomers having two or more polymerizable unsaturated groups per molecule, for example, allyl (meth)acrylate, ethylene glycol di(meth)acrylate, 1,4-butanediol di(meth)acrylate, neopentyl glycol di(meth)acrylate, and 1,6-hexanediol di(meth)acrylate;

($c_{11}$) epoxy group-containing polymerizable unsaturated monomers, for example, glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth) acrylate, and allyl glycidyl ether;

($c_{12}$) (meth)acrylates having a polyoxyethylene chain with an alkoxy group at the molecular terminal;

($c_{13}$) polymerizable unsaturated monomers having a UV-absorbing functional group, for example, 2-hydroxy-4-(3-methacryloyloxy-2-hydroxypropoxy)benzophenone, 2-hydroxy-4-(3-acryloyloxy-2-hydroxypropoxy) benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone, and 2-(2'-hydroxy-5'-methacryloyloxyethylphenyl)-2H-benzotriazole;

($c_{14}$) photostable polymerizable unsaturated monomers, for example, 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth) acryloylamino-2,2,6,6-tetramethylpiperidine, 1-(meth) acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, and 1-crotonoyl-4-crotonoyloxy-2,2,6,6-tetramethylpiperidine;

($c_{15}$) polymerizable unsaturated monomers having a carbonyl group, for example, acrolein, diacetone acrylamide, diacetone methacrylamide, acetoacetoxyethyl methacrylate, formylstyrol, and vinyl alkyl ketones having from 4 to 7 carbons (for example, vinyl methyl ketone, vinyl ethyl ketone, and vinyl butyl ketone);

($c_{16}$) polymerizable unsaturated monomers having a photopolymerizable functional group such as a maleimide group.

The acrylic resin (A1) containing a hydroxyl group and an acid group has an acid value in a range of from 50 to 150 mg KOH/g, preferably from 60 to 130 mg KOH/g, and more preferably from 70 to 100 mg KOH/g from the viewpoint of improving the wettability of the second water-based coloring paint (P2).

The acrylic resin (A1) containing a hydroxyl group and an acid group has a hydroxyl value in a range of from 100 to 300 mg KOH/g, preferably from 120 to 250 mg KOH/g, and more preferably from 140 to 230 mg KOH/g from the perspective of improving the wettability of the second water-based coloring paint (P2).

In the present specification, the acid value of the acrylic resin (A1) containing a hydroxyl group and an acid group and the acid value of the hydroxyl group-containing acrylic resin (B1) mean theoretical acid values. The theoretical acid value is the number of milligrams of potassium hydroxide theoretically required to neutralize 1 g of the resin component, and is an acid value calculated from the molar amount of acid groups contained in the constituent polymerizable unsaturated monomers and the total mass of the constituent polymerizable unsaturated monomers. Specifically, it can be calculated based on the following equation.

Theoretical acid value (mg KOH/g)=[the number of moles of acid group derived from acid group-containing polymerizable unsaturated monomer (mmol)]x 56.1/[charged amount of polymerizable unsaturated monomer (g)]

Here, "56.1" is the molecular weight of KOH, and the above "charged amount of polymerizable unsaturated monomer" is the total mass of the polymerizable unsaturated monomer.

In the present specification, the hydroxyl value of the acrylic resin (A1) containing a hydroxyl group and an acid group and the hydroxyl value of the hydroxyl group-containing acrylic resin (B1) mean theoretical hydroxyl values. The theoretical hydroxyl value is the number of mg of potassium hydroxide when the amount of hydroxyl groups contained in 1 g of the resin component is converted into potassium hydroxide, and is a hydroxyl value calculated from the molar amount of hydroxyl groups contained in the constituent polymerizable unsaturated monomer and the total mass of the constituent polymerizable unsaturated monomer. Specifically, it can be calculated based on the following equation.

Theoretical hydroxyl value (mg KOH/g)=[the number of moles of hydroxyl group derived from hydroxyl group-containing polymerizable unsaturated monomer (mmol)]×56.1/[charged amount of polymerizable unsaturated monomer (g)]

Here, "56.1" is the molecular weight of KOH, and the above "charged amount of polymerizable unsaturated monomer" is the total mass of the polymerizable unsaturated monomer.

The acid value of the acrylic resin (A1) containing a hydroxyl group and an acid group can be adjusted, for example, by adjusting the ratio of the acid group-containing polymerizable unsaturated monomer (b) among the hydroxyl group-containing polymerizable unsaturated monomer (a), the acid group-containing polymerizable unsaturated monomer (b), and the additional polymerizable unsaturated monomer (c).

The hydroxyl value of the acrylic resin (A1) containing a hydroxyl group and an acid group can be adjusted, for example, by adjusting the ratio of the hydroxyl group-containing polymerizable unsaturated monomer (a) among the hydroxyl group-containing polymerizable unsaturated monomer (a), the acid group-containing polymerizable unsaturated monomer (b), and the additional polymerizable unsaturated monomer (c).

The compound (A) has a weight average molecular weight in a range of from 500 to 8000, preferably in a range of from 800 to 7000, more preferably in a range of from 1500 to 5000, and even more preferably in a range of from 2000 to 5000. Thus, a multilayer coating film having excellent resistance to metallic unevenness can be formed.

When the compound (A) is the acrylic resin (A1) containing a hydroxyl group and an acid group, the acrylic resin (A1) containing a hydroxyl group and an acid group has a weight average molecular weight preferably in a range of from 1000 to 8000, more preferably in a range of from 1000 to 7000, still more preferably in a range of from 1500 to 6000, and still more preferably in a range of from 2000 to 5000. Thus, a multilayer coating film having excellent resistance to metallic unevenness can be formed.

In the present specification, the weight average molecular weight is a value obtained by converting a weight average molecular weight measured by gel permeation chromatography ("HLC-8120GPC" manufactured by Tosoh Corporation) based on a weight average molecular weight of polystyrene. The gel permeation chromatography is performed using four columns "TSKgel G-4000H×L", "TSKgel G-3000H×L", "TSKgel G-2500H×L", and "TSKgel G-2000H×L" (all available from Tosoh Corporation, trade names) under conditions of a mobile phase of tetrahydrofuran, a measurement temperature of 40° C., a flow rate of 1 mL/min, and a detector of RI.

The weight average molecular weight of the acrylic resin (A1) containing a hydroxyl group and an acid group can be adjusted, for example, by adjusting the type and amount of the polymerization initiator, and the polymerization temperature when polymerizing the hydroxyl group-containing polymerizable unsaturated monomer (a), the acid group-containing polymerizable unsaturated monomer (b), and the additional polymerizable unsaturated monomer (c).

<Film-Forming Resin (B)>

The film-forming resin (B) includes resins that do not correspond to the compound (A), and examples thereof include acrylic resins, polyester resins, urethane resins, and alkyd resins. The film-forming resin (B) preferably has a hydroxyl group from the perspective of the smoothness and water resistance of the multilayer coating film to be formed.

From the perspective of the brightness, smoothness and the like of the multilayer coating film to be formed, the film-forming resin (B) preferably contains, as at least one type thereof, at least one type of resin selected from a hydroxyl group-containing acrylic resin (B1), a hydroxyl group-containing polyester resin (B2), and a urethane resin, more preferably contains at least one type of resin selected from a hydroxyl group-containing acrylic resin (B1) and a hydroxyl group-containing polyester resin (B2), and still more preferably contains a hydroxyl group-containing acrylic resin (B1) and a hydroxyl group-containing polyester resin (B2).

<Hydroxyl Group-Containing Acrylic Resin (B1)>

The hydroxyl group-containing acrylic resin (B1) is an acrylic resin having at least one hydroxyl group in one molecule, having an acid value in a range of from 50 to 150 mg KOH/g, a hydroxyl value in a range of from 100 to 300 mg KOH/g, and a weight average molecular weight in a range of from 500 to 8000, and it does not fall under the acrylic resin (A1) containing a hydroxyl group and an acid group.

The hydroxyl group-containing acrylic resin (B1) is an acrylic resin having at least one hydroxyl group in one molecule. The hydroxyl group-containing acrylic resin (B1) can be usually produced by copolymerizing a monomer mixture containing a hydroxyl group-containing polymerizable unsaturated monomer (b1-a) and additional polymerizable unsaturated monomer (b1-b) copolymerizable with the hydroxyl group-containing polymerizable unsaturated monomer (b1-a) by a method known per se, such as a solution polymerization method in an organic solvent or an emulsion polymerization method in an aqueous medium.

The hydroxyl group-containing polymerizable unsaturated monomer (b1-a) is a compound having at least one hydroxyl group and at least one polymerizable unsaturated group in one molecule, and examples thereof include monoesterified products of a dihydric alcohol having from 2 to 8 carbons and a (meth)acrylic acid, such as 2-hydroxyethyl (meth)acrylate, 2-hydroxypropyl (meth)acrylate, 3-hydroxypropyl (meth)acrylate, and 4-hydroxybutyl (meth) acrylate; ε-caprolactone modified products of these monoesterified products; N-hydroxymethyl (meth)acrylamides; allyl alcohols; and (meth)acrylates having a polyoxyethylene chain containing a hydroxyl group at a molecular terminal.

The additional polymerizable unsaturated monomer (b1-b) that is copolymerizable with the hydroxyl group-containing polymerizable unsaturated monomer (b1-a) can be appropriately selected and used according to the desired properties of the hydroxyl group-containing acrylic resin (B1). Specific examples of the additional polymerizable unsaturated monomer (b1-b) include the acid group-containing polymerizable unsaturated monomer (b) described in the explanation section of the acrylic resin (A1) containing a hydroxyl group and an acid group, and the additional polymerizable unsaturated monomer (c) copolymerizable with the hydroxyl group-containing polymerizable unsaturated monomer (a) and the acid group-containing polymerizable unsaturated monomer (b). These resins may be used alone, or in combination of two or more thereof.

The hydroxyl group-containing polymerizable unsaturated monomer (b1-a) can typically be used at an amount in a range of from 1 to 50 mass %, preferably from 2 to 40 mass %, and more preferably from 3 to 30 mass %, based on the total amount of the hydroxyl group-containing polymerizable unsaturated monomer (b1-a) and the additional polymerizable unsaturated monomer (b1-b).

From the viewpoint of storage stability and water resistance of the multilayer coating film to be formed, the hydroxyl group-containing acrylic resin (B1) typically has a hydroxyl value in a range of preferably from 1 to 200 mg KOH/g, particularly preferably from 2 to 150 mg KOH/g, and even more particularly preferably from 5 to 100 mg KOH/g.

From the perspective of water resistance of the multilayer coating film to be formed, the hydroxyl group-containing acrylic resin (B1) typically has an acid value in a range of preferably from 1 to 200 mg KOH/g, particularly preferably from 2 to 150 mg KOH/g, and even more particularly preferably from 5 to 80 mg KOH/g.

As the hydroxyl group-containing acrylic resin (B1), a water-soluble or water-dispersible hydroxyl group-containing acrylic resin can be suitably used, but it is preferable that the hydroxyl group-containing acrylic resin (B1) contains a water-dispersible hydroxyl group-containing acrylic resin (B11) from the perspective of metallic unevenness resistance, brightness, and the like of the multilayer coating film to be formed.

The water-dispersible hydroxyl group-containing acrylic resin (B11) can be produced, for example, by copolymerizing a hydroxyl group-containing polymerizable unsaturated monomer (b1-a) and additional polymerizable unsaturated monomer (b1-b) copolymerizable with the hydroxyl group-containing polymerizable unsaturated monomer (b1-a) by an emulsion polymerization method or the like in an aqueous medium.

The water-dispersible hydroxyl group-containing acrylic resin (B11) contains a water-dispersible hydroxyl group-containing acrylic resin (B11') having a core/shell type multilayer structure having a crosslinked core part, containing, as a core part, a copolymer (I) obtained by copolymerizing a polymerizable unsaturated monomer (b1-c) having at least two polymerizable unsaturated groups in one molecule in an amount of from 0.1 to 30 mass % and a polymerizable unsaturated monomer (b1-d) having one polymerizable unsaturated group in one molecule in an amount of from 70 to 99.9 mass %, and as a shell part, a copolymer (II) obtained by copolymerizing a hydroxyl group-containing polymerizable unsaturated monomer (b1-a) in an amount of from 1 to 35 mass % and a polymerizable unsaturated monomer (b1-e) other than the hydroxyl group-containing polymerizable unsaturated monomer (b1-a) in an amount of from 65 to 99 mass %, from the perspective of the metallic unevenness resistance, brightness, and the like of the multilayer coating film to be formed.

Examples of the polymerizable unsaturated monomer (b1-c) having at least two polymerizable unsaturated groups in one molecule, include allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-tris(hydroxymethyl)ethane di(meth) acrylate, 1,1,1-tris(hydroxymethyl)ethane tri(meth)acrylate, 1,1,1-tris(hydroxymethyl)propane tri(meth)acrylate, triallylisocyanurate, diallyltetraphthalate, and divinylbenzene. Each of these can be used alone, or two or more types can be combined and used.

The amount of the polymerizable unsaturated monomer (b1-c) having at least two polymerizable unsaturated groups in one molecule can be typically used in an amount ranging from 0.1 to 30 mass %, preferably from 0.5 to 10 mass %, and more preferably from 1 to 5 mass % based on the total mass of the polymerizable unsaturated monomer (b1-c) having at least two polymerizable unsaturated groups in one molecule and the polymerizable unsaturated monomer (b1-d) having one polymerizable unsaturated group in one molecule.

The polymerizable unsaturated monomer (b1-d) having one polymerizable unsaturated group in one molecule is a polymerizable unsaturated monomer that is copolymerizable with the polymerizable unsaturated monomer (b1-c) having at least two polymerizable unsaturated groups per molecule, and includes compounds containing one polymerizable unsaturated group, such as, a vinyl group, a (meth)acryloyl group, or an allyl group, in one molecule.

Specific examples of the polymerizable unsaturated monomer (b1-d) having one polymerizable unsaturated group in one molecule include monomers listed in the section of "Acrylic resin (A1) containing hydroxyl group and acid group", such as ($c_1$) an alkyl or cycloalkyl (meth) acrylate, ($c_2$) a polymerizable unsaturated monomer having an isobornyl group, ($c_3$) a polymerizable unsaturated monomer having an adamantyl group, ($c_5$) an aromatic ring-containing polymerizable unsaturated monomer, (b1) a carboxyl group-containing polymerizable unsaturated monomer, and ($c_9$) a nitrogen-containing polymerizable unsaturated monomer. Each of these can be used alone, or two or more types can be combined and used.

The polymerizable unsaturated monomer (b1-d) having one polymerizable unsaturated group in one molecule preferably contains, as at least a part of the component thereof, a polymerizable unsaturated monomer (b1-d1) having one polymerizable unsaturated group in one molecule and an alkyl group having 1 or 2 carbons, from the perspective of metallic unevenness resistance, brightness, and the like of the multilayer coating film to be formed.

From the perspective of smoothness of the multilayer coating film to be formed or the like, of the polymerizable unsaturated monomers (b1-d1) having one polymerizable unsaturated group in one molecule and having an alkyl group having 1 or 2 carbons, the polymerizable unsaturated monomers (b1-d1) is preferably at least one polymerizable unsaturated monomer selected from methyl (meth)acrylate and ethyl (meth)acrylate, is more preferably at least one polymerizable unsaturated monomer selected from methyl methacrylate and ethyl acrylate, and is particularly preferably methyl methacrylate, and use of both methyl methacrylate and ethyl acrylate is even more particularly preferable.

The polymerizable unsaturated monomer (b1-d1) having one polymerizable unsaturated group in one molecule and an alkyl group having 1 or 2 carbons is preferably used typically within a range of from 10 to 99.9 mass % based on the total mass of the polymerizable unsaturated monomer (b1-c) having at least two polymerizable unsaturated groups in one molecule and the polymerizable unsaturated monomer (b1-d) having one polymerizable unsaturated group in one molecule from the perspective of metallic unevenness resistance, brightness, and the like of the multilayer coating film to be formed. In particular, from the perspective of metallic unevenness resistance, brightness, and the like of the multilayer coating film to be formed, the use proportion of the polymerizable unsaturated monomer (b1-d1) having one polymerizable unsaturated group in one molecule and an alkyl group having 1 or 2 carbons is preferably in a range of from 60 to 99.9 mass %, more preferably in a range of from 70 to 99.5 mass %, and particularly preferably in a range of from 75 to 99 mass %, based on the total mass of the polymerizable unsaturated monomer (b1-c) having at least two polymerizable unsaturated groups in one molecule and the polymerizable unsaturated monomer (b1-d) having one polymerizable unsaturated group in one molecule.

On the other hand, as described above, examples of the hydroxyl group-containing polymerizable unsaturated monomer (b1-a), which constitutes the shell, include monoesterified products of a dihydric alcohol having from 2 to 8 carbons and (meth)acrylic acid, such as 2-hydroxyethyl (meth)acrylate, 2-hydroxypropyl (meth)acrylate, 3-hydroxypropyl (meth)acrylate, and 4-hydroxybutyl (meth) acrylate; ε-caprolactone modified products of these monoesterified products of a dihydric alcohol having from 2 to 8 carbons and (meth)acrylic acid; allyl alcohols; and (meth) acrylates having a polyoxyethylene chain with a hydroxyl group at a molecular terminal. Each of these can be used alone, or two or more types can be combined and used.

The hydroxyl group-containing polymerizable unsaturated monomer (b1-a) can be used in an amount ranging from 1 to 35 mass %, preferably from 5 to 25 mass %, and more preferably from 8 to 20 mass %, based on the total mass of the hydroxyl group-containing polymerizable unsaturated monomer (b1-a) and the polymerizable unsaturated monomer (b1-e).

Examples of the polymerizable unsaturated monomer (b1-e) constituting the shell include monomers listed in the section of "Acrylic resin (A1) containing hydroxyl group and acid group", for example, ($c_1$) an alkyl or cycloalkyl (meth) acrylate, ($c_2$) a polymerizable unsaturated monomer having an isobornyl group, ($c_3$) a polymerizable unsaturated monomer having an adamantyl group, ($c_5$) an aromatic ring-containing polymerizable unsaturated monomer, and (b1) a carboxyl group-containing polymerizable unsaturated monomer. These resins may be used alone, or in combination of two or more thereof.

The polymerizable unsaturated monomer (b1-e) other than the hydroxyl group-containing polymerizable unsaturated monomer (b1-a) preferably contains, as at least a part of components thereof, a polymerizable unsaturated monomer (b1-e1) having one polymerizable unsaturated group in one molecule and a hydrocarbon group having from 4 to 22 carbons, from the viewpoint of metallic unevenness resistance, brightness, and the like of the multilayer coating film to be formed.

As the polymerizable unsaturated monomer (b1-e1) having one polymerizable unsaturated group in one molecule and having a hydrocarbon group having from 4 to 22 carbons, a polymerizable unsaturated monomer containing a linear, branched or cyclic saturated or unsaturated hydrocarbon group having from 4 to 22 carbons can be used. Specific examples of the polymerizable unsaturated monomer (b1-e1) having one polymerizable unsaturated group in one molecule and having a hydrocarbon group having from 4 to 22 carbons include alkyl or cycloalkyl (meth)acrylates, such as n-butyl (meth)acrylate, isobutyl (meth)acrylate, tert-butyl (meth)acrylate, n-hexyl (meth)acrylate, n-octyl (meth) acrylate, 2-ethylhexyl (meth)acrylate, nonyl (meth)acrylate, tridecyl (meth)acrylate, lauryl (meth)acrylate, stearyl (meth) acrylate, "isostearyl acrylate" (trade name, available from Osaka Organic Chemical Industry Ltd.), cyclohexyl (meth) acrylate, methylcyclohexyl (meth)acrylate, tert-butyl cyclohexyl (meth)acrylate, and cyclododecyl (meth)acrylate; polymerizable unsaturated monomers having an isobornyl group, such as isobornyl (meth)acrylate; polymerizable unsaturated monomers having an adamantyl group, such as adamantyl (meth)acrylate; and vinyl aromatic compounds such as styrene, α-methylstyrene, and vinyl toluene. Each of these can be used alone, or two or more types can be combined and used.

As the polymerizable unsaturated monomer (b1-e1) having one polymerizable unsaturated group in one molecule and having a hydrocarbon group having from 4 to 22 carbons, a polymerizable unsaturated monomer having an alkyl group having from 4 to 8 carbons is particularly preferable, and a polymerizable unsaturated monomer having an alkyl group having from 4 to 6 carbons is more preferable, from the perspective of metallic unevenness resistance, brightness, and the like of the multilayer coating film to be formed. Among these, at least one butyl (meth) acrylate selected from n-butyl (meth)acrylate, isobutyl (meth)acrylate and tert-butyl (meth)acrylate is preferable, n-butyl (meth)acrylate is more preferable, and n-butyl acrylate is particularly preferable.

The polymerizable unsaturated monomer (b1-e1) having one polymerizable unsaturated group in one molecule and a hydrocarbon group having from 4 to 22 carbons is preferably used in a range of from 25 to 80 mass %, particularly from 35 to 70 mass %, and more particularly from 45 to 65 mass %, based on the total mass of the polymerizable unsaturated monomer (b1-c) having at least two polymerizable unsaturated groups in one molecule and the polymerizable unsaturated monomer (b1-d) having one polymerizable unsaturated group in one molecule, from the perspective of metallic unevenness resistance, brightness, and the like of the multilayer coating film to be formed.

When at least one butyl (meth)acrylate selected from n-butyl (meth)acrylates, isobutyl (meth)acrylates, and tert-butyl (meth)acrylates is used as at least one type of the polymerizable unsaturated monomer (b1-e1) having one polymerizable unsaturated group in one molecule and a hydrocarbon group having from 4 to 22 carbons, the total amount of the butyl (meth)acrylate is preferably in a range of from 25 to 70 mass %, particularly from 35 to 65 mass %, more particularly from 45 to 60 mass % based on the total amount of the polymerizable unsaturated monomer (b1-c) having at least two polymerizable unsaturated groups in one molecule and the polymerizable unsaturated monomer (b1-d) having one polymerizable unsaturated group in one molecule.

The polymerizable unsaturated monomer (b1-e) other than the hydroxyl group-containing polymerizable unsaturated monomer (b1-a) preferably contains a carboxyl group-containing polymerizable unsaturated monomer (b1-e2) as at least a part of the component thereof from the viewpoint of smoothness and the like of the multilayer coating film to be formed.

Examples of the carboxyl group-containing polymerizable unsaturated monomer (b1-e2) include (meth)acrylic acid, maleic acid, crotonic acid, and β-carboxyethyl acrylate, and of these, (meth)acrylic acid is suitable.

From the perspective of the stability of the water-dispersible hydroxyl group-containing acrylic resin (A11) in an aqueous medium and the resistance to metallic unevenness, brightness, and water resistance of the multilayer coating film to be formed, the carboxyl group-containing polymerizable unsaturated monomer (b1-e2) is preferably in a range of from 1 to 25 mass %, more preferably in a range of from 3 to 15 mass %, and particularly preferably in a range of from 5 to 10 mass %, based on the total mass of the hydroxyl group-containing polymerizable unsaturated monomer (b1-a) and the polymerizable unsaturated monomer (b1-e).

The water-dispersible hydroxyl group-containing acrylic resin (B11') having a core/shell type multilayer structure preferably has a hydroxyl value within a range of from 1 to 100 mg KOH/g, particularly from 2 to 85 mg KOH/g, more particularly from 5 to 75 mg KOH/g, from the perspective of metallic unevenness resistance, brightness, water resistance, and the like of the multilayer coating film to be formed.

Further, from the perspective of metallic unevenness resistance, brightness, and the like of the multilayer coating film to be formed, it is preferable to use a polymerizable unsaturated monomer having only one polymerizable unsaturated group in one molecule as the hydroxyl group-containing polymerizable unsaturated monomer (b1-a) and the polymerizable unsaturated monomer (b1-e), and to make the shell of the water-dispersible hydroxyl group-containing acrylic resin (B11') having a core/shell type multilayer structure uncrosslinked.

The water-dispersible hydroxyl group-containing acrylic resin (B11') having a core/shell type multilayer structure can be obtained, for example, by adding a monomer mixture (II) containing a hydroxyl group-containing polymerizable unsaturated monomer (b1-a) in an amount of from 1 to 35 mass % and a polymerizable unsaturated monomer (b1-e) other than the hydroxyl group-containing polymerizable unsaturated monomer (b1-a) in an amount of from 65 to 99 mass % to an emulsion obtained by performing emulsion polymerization on a monomer mixture (I) containing a polymerizable unsaturated monomer (b1-c) having at least two polymerizable unsaturated groups in one molecule in an amount of from 0.1 to 30 mass % and a polymerizable unsaturated monomer (b1-d) having one polymerizable unsaturated group in one molecule in an amount of from 70 to 99.9 mass %, and further performing polymerization.

The emulsion polymerization of the above monomer mixture (I) can be carried by a known method, for example, using a polymerization initiator in the presence of an emulsifier.

As the emulsifier, anionic emulsifiers or nonionic emulsifiers are suitable. Examples of the anionic emulsifier include sodium salts and ammonium salts of organic acids such as alkyl sulfonic acid, alkylbenzene sulfonic acid, and alkylphosphoric acid. Examples of the nonionic emulsifier include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, and polyoxyethylene sorbitan monolaurate.

A polyoxyalkylene group-containing anionic emulsifier having, per molecule, an anionic group and a polyoxyalkylene group such as a polyoxyethylene group or a polyoxypropylene group, or a reactive anionic emulsifier having, per molecule, the anionic group and a radically polymerizable unsaturated group may be used, and of these, use of a reactive anionic emulsifier is suitable.

Examples of the reactive anionic emulsifier include sodium salts and ammonium salts of sulfonic acid compounds having a radically polymerizable unsaturated group such as a (meth)allyl group, a (meth)acryloyl group, a propenyl group, and a butenyl group. Of these, an ammonium salt of a sulfonic acid compound having a radically polymerizable unsaturated group is preferred because of the excellent water resistance of the multilayer coating film that is formed. Examples of the ammonium salt of a sulfonic acid compound include commercially available products such as "Latemul S-180A" (trade name, available from Kao Corporation).

Among the ammonium salts of sulfonic acid compounds having a radically polymerizable unsaturated group, an ammonium salt of a sulfonic acid compound having a radically polymerizable unsaturated group and a polyoxyalkylene group is more preferable. Examples of ammonium salts of sulfonic acid compounds having a radically polymerizable unsaturated group and a polyoxyalkylene group include commercially available products such as "Aqualon KH-10" (trade name, available from DKS Co., Ltd.) and "SR-1025A" (trade name, available from Adeka Corporation).

The emulsifier is usually used at an amount in a range from 0.1 to 15 mass %, preferably from 0.5 to 10 mass %, and more preferably from 1 to 5 mass %, based on the total amount of all monomers that are used.

The polymerization initiator may be oil-soluble or water-soluble, and examples include organic peroxides, such as benzoyl peroxide, octanoyl peroxide, lauroyl peroxide, stearoyl peroxide, cumene hydroperoxide, tert-butyl peroxide, tert-butyl peroxylaurate, tert-butyl peroxyisopropyl carbonate, tert-butyl peroxyacetate, and diisopropyl benzene hydroperoxide; azo compounds such as azobis isobutyronitrile, azobis (2,4-dimethylvaleronitrile), azobis (2-methylpropionitrile), azobis (2-methylbutyronitrile), 4,4'-azobis (4-cyanobutanoic acid), dimethylazobis (2-methylproprionate), azobis [2-methyl-N-(2-hydroxyethyl)-propionamide], and azobis {2-methyl-N-[2-(1-hydroxybutyl)]-propionamide}; and persulfates such as potassium persulfate, ammonium persulfate, and sodium persulfate. Each of these can be used alone, or two or more types can be combined and used.

Furthermore, as necessary, a reducing agent such as a sugar, sodium formaldehyde sulfoxylate, and an iron complex may be used in combination with the polymerization initiator, and a redox polymerization system may be formed.

The polymerization initiator is ordinarily used at an amount in a range preferably from 0.1 to 5 mass %, and particularly preferably from 0.2 to 3 mass %, based on the total mass of all monomers that are used. The method of adding the polymerization initiator is not particularly limited, and can be appropriately selected according to the type, amount, and the like of the polymerization initiator. For example, the polymerization initiator may be contained in a monomer mixture or an aqueous medium in advance, or may be added all at once or added dropwise at the time of polymerization.

The water-dispersible hydroxyl group-containing acrylic resin (B11') having a core/shell type multilayer structure can be obtained by adding a monomer mixture (II) containing a hydroxyl group-containing polymerizable unsaturated monomer (b1-a) and a polymerizable unsaturated monomer (b1-e) other than the hydroxyl group-containing polymerizable unsaturated monomer (b1-a) to the emulsion obtained as described above, and further polymerizing the mixture.

As necessary, the monomer mixture (II) can contain, as appropriate, components such as a polymerization initiator like those listed above, a chain transfer agent, a reducing agent, and an emulsifier.

In addition, while the monomer mixture (II) can be added dropwise as is, the monomer mixture (II) is desirably dispersed in an aqueous medium and added dropwise as a monomer emulsion. The particle size of the monomer emulsion in this case is not particularly limited. Polymerization of the monomer mixture (II) can be implemented by, for example, adding the monomer mixture (II), which may be emulsified, to the above-mentioned emulsion all at once or in a dropwise manner, and then heating to an appropriate temperature while stirring.

The water-dispersible hydroxyl group-containing acrylic resin (B11') having a core/shell type multilayer structure can have a core/shell type multilayer structure in which a copolymer (I) formed from a monomer mixture (I) containing a polymerizable unsaturated monomer (b1-c) having at least two polymerizable unsaturated groups in one molecule and a polymerizable unsaturated monomer (b1-d) having one polymerizable unsaturated group in one molecule is used as a core, and a copolymer (II) formed from a monomer mixture (II) containing a polymerizable unsaturated monomer (b1-e) other than the hydroxyl group-containing polymerizable unsaturated monomer (b1-a) and the hydroxyl group-containing polymerizable unsaturated monomer (b1-e) is used as a shell.

The water-dispersible hydroxyl group-containing acrylic resin (B11') having a core/shell type multilayer structure may be formed into resin particles containing three or more layers by adding a step of performing emulsion polymerization by supplying a polymerizable unsaturated monomer (one type or a mixture of two or more types) for forming another resin layer between the step of obtaining the copolymer (I) and the step of obtaining the copolymer (II).

In the present invention, the "shell" of the water-dispersible hydroxyl group-containing acrylic resin (B11') having a core/shell type multilayer structure means a polymer layer present in the outermost layer of the resin particle, the "core" means a polymer layer of a resin particle inner layer excluding the shell part, and the "core/shell type structure" means a structure having the core and the shell. The core/shell structure described above is typically a layer structure in which the core is completely covered by the shell, but depending on the mass ratio and the like of the core and shell, the amount of the monomer of the shell may be insufficient for forming a layer structure. In such a case, it is not necessary to have a complete layer structure as described above, and the structure may be a structure in which a portion of the core is covered by the shell, or a structure in which a polymerizable unsaturated monomer that is a constituent element of the shell is graft polymerized with a portion of the core. The concept of the multilayer structure in the core/shell type structure is applied in the same manner to a case where a multilayer structure is formed in the core in the water-dispersible hydroxyl group-containing acrylic resin (B11') having a core/shell type multilayer structure.

From the perspective of smoothness of the multilayer coating film that is formed or the like, the ratio of the copolymer (I) and the copolymer (II) in the water-dispersible hydroxyl group-containing acrylic resin (B11') having a core/shell multilayer structure is, in terms of a solid content mass ratio of the copolymer (I)/copolymer (II), preferably in a range of from 10/90 to 90/10, particularly preferably from 50/50 to 85/15, and more particularly preferably from 65/35 to 80/20.

The water-dispersible hydroxyl group-containing acrylic resin (B11) can generally have an average particle size in a range of from 10 to 1000 nm, and in particular from 20 to 500 nm. Within this range, from the perspective of metallic unevenness resistance and brightness of the multilayer coating film to be formed, the average particle size of the water-dispersible hydroxyl group-containing acrylic resin (B11) is preferably in a range of from 30 to 180 nm, and more preferably in a range of from 40 to 150 nm.

In the present specification, the average particle size of the water-dispersible hydroxyl group-containing acrylic resin (B11) is a value measured at 20° C. using a particle size distribution measurement device based on a dynamic light scattering method after dilution with deionized water by a common method. As the dynamic light scattering particle size distribution measurement device, for example, "ELSZ-2000ZS" (trade name, manufactured by Otsuka Electronics Co., Ltd.) can be used.

In the present invention, when the hydroxyl group-containing acrylic resin (B1) contains the water-dispersible hydroxyl group-containing acrylic resin (B11), it is desirable to neutralize acid groups such as carboxyl groups of the water-dispersible hydroxyl group-containing acrylic resin (B11) with a neutralizing agent to improve the mechanical stability of the water-dispersion particles of the water-dispersible hydroxyl group-containing acrylic resin (B11). The neutralizing agent can be used without any particular limitation as long as it can neutralize the acidic groups. Examples include sodium hydroxide, potassium hydroxide, trimethylamine, 2-(dimethylamino)ethanol, 2-amino-2-methyl-1-propanol, triethylamine, and ammonia water. These neutralizing agents are preferably used at an amount such that the pH of the aqueous dispersion of the water-dispersible hydroxyl group-containing acrylic resin (B11) after neutralization is from approximately 6.5 to approximately 9.0.

When the first water-based paint (P1) contains the hydroxyl group-containing acrylic resin (B1), the content of the hydroxyl group-containing acrylic resin (B1) in the first water-based paint (P1) is preferably in a range of from 5 to 60 parts by mass, preferably from 10 to 50 parts by mass, and more preferably from 15 to 35 parts by mass, based on 100 parts by mass of the resin solid content in the first water-based paint (P1), from the perspective of metallic unevenness resistance, water resistance, and the like of the coating film to be formed.

When the first water-based paint (P1) contains the water-dispersible hydroxyl group-containing acrylic resin (B11), the content of the water-dispersible hydroxyl group-containing acrylic resin (B11) in the first water-based paint (P1) is preferably in a range of from 5 to 60 parts by mass, preferably from 10 to 50 parts by mass, and more preferably from 12 to 35 parts by mass based on 100 parts by mass of the resin solid content in the first water-based paint (P1) from the perspective of metallic unevenness resistance, water resistance, and the like of the coating film to be formed.

<Hydroxyl Group-Containing Polyester Resin (B2)>

The first water-based paint (P1) preferably further contains a hydroxyl group-containing polyester resin (B2) from the perspective of smoothness, brightness, and the like of the multilayer coating film to be formed.

The hydroxyl group-containing polyester resin (B2) can be typically produced by esterification reaction or transesterification reaction between an acid component and an alcohol component.

As the acid component, a compound commonly used as an acid component in the production of a polyester resin can be used. Examples of such an acid component include aliphatic polybasic acids, alicyclic polybasic acids, and aromatic polybasic acids.

The aliphatic polybasic acid is generally an aliphatic compound having two or more carboxyl groups per molecule, an acid anhydride of the aliphatic compound, or an esterified product of the aliphatic compound. Examples of the aliphatic polybasic acid include aliphatic polybasic carboxylic acids such as succinic acid, glutaric acid, adipic acid, pimelic acid, suberic acid, azelaic acid, sebacic acid, undecanedioic acid, dodecanedioic acid, brassylic acid, octadecanedioic acid, citric acid, and butanetetracarboxylic acid; anhydrides of these aliphatic polybasic carboxylic acids; and esterified products of around C14 lower alkyls of the aliphatic polybasic carboxylic acids. The aliphatic polybasic acids can be used alone, or two or more types thereof can be combined and used.

From the perspective of smoothness of the multilayer coating film that is formed, at least one type of aliphatic polybasic acid selected from the group consisting of succinic acid, succinic anhydride, adipic acid, and adipic anhydride is preferably used as at least one type of the aliphatic polybasic acid.

The alicyclic polybasic acid is generally a compound having one or more alicyclic structures and two or more carboxyl groups per molecule, an acid anhydride of the compound, or an esterified product of the compound. The alicyclic structure is primarily a ring structure of four to six members. Examples of the alicyclic polybasic acid include alicyclic polybasic carboxylic acids such as 1,2-cyclohexane dicarboxylic acid, 1,3-cyclohexane dicarboxylic acid, 1,4-cyclohexane dicarboxylic acid, 4-cyclohexene-1,2-dicarboxylic acid, 3-methyl-1,2-cyclohexane dicarboxylic acid, 4-methyl-1,2-cyclohexane dicarboxylic acid, 1,2,4-cyclohexane tricarboxylic acid, and 1,3,5-cyclohexane tricarboxylic acid; anhydrides of the alicyclic polybasic carboxylic acids; and esterified products of around C14 lower alkyls of the alicyclic polybasic carboxylic acids. The alicyclic polybasic acids can be used alone, or two or more types thereof can be combined and used.

From the perspective of smoothness of the multilayer coating film that is formed, at least one alicyclic polybasic acid selected from the group consisting of 1,2-cyclohexane dicarboxylic acid, 1,2-cyclohexane dicarboxylic anhydride, 1,3-cyclohexane dicarboxylic acid, 1,4-cyclohexane dicarboxylic acid, 4-cyclohexene-1,2-dicarboxylic acid, and 4-cyclohexene-1,2-dicarboxylic anhydride is preferably used as at least one type of the alicyclic polybasic acid, and of these, use of 1,2-cyclohexane dicarboxylic acid and/or 1,2-cyclohexane dicarboxylic anhydride is preferable.

The aromatic polybasic acid is generally an aromatic compound having two or more carboxyl groups per molecule, an acid anhydride of the aromatic compound, or an esterified product of the aromatic compound. Examples of the aromatic polybasic acid include aromatic polybasic carboxylic acids, such as phthalic acid, isophthalic acid, terephthalic acid, naphthalene dicarboxylic acid, 4,4'-biphenyl dicarboxylic acid, trimellitic acid, and pyromellitic acid; anhydrides of these aromatic polybasic carboxylic acids; and esterified products of around C14 lower alkyls of these aromatic polybasic carboxylic acids. The aromatic polybasic acids can be used alone, or two or more types thereof can be combined and used.

At least one type of aromatic polybasic acid selected from the group consisting of phthalic acid, phthalic anhydride, isophthalic acid, trimellitic acid, and trimellitic anhydride is preferably used as at least one type of the aromatic polybasic acid.

Also, an acid component other than the aliphatic polybasic acid, the alicyclic polybasic acid, and the aromatic polybasic acid can be used. Such an acid component is not particularly limited, and examples thereof include fatty acids, such as coconut oil fatty acid, cotton seed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, and safflower oil fatty acid; monocarboxylic acids such as lauric acid, myristic acid, palmitic acid, stearic acid, oleic acid, linoleic acid, linolenic acid, benzoic acid, p-tert-butylbenzoic acid, cyclohexanoic acid, and 10-phenyloctadecanoic acid; and hydroxycarboxylic acids such as lactic acid, 3-hydroxybutanoic acid, and 3-hydroxy-4-ethoxybenzoic acid. These acid components can be used alone or in a combination of two or more types.

As the alcohol component, a polyhydric alcohol having two or more hydroxyl groups per molecule can be suitably used. Examples of the polyhydric alcohols include dihydric alcohols, such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, neopentyl glycol hydroxypivalate ester, hydrogenated bisphenol A, hydrogenated bisphenol F, and dimethylolpropionic acid; polylactone diols produced by adding a lactone compound such as ε-caprolactone to these dihydric alcohols; ester diol compounds such as bis(hydroxyethyl) terephthalate; polyether diol compounds such as an alkylene oxide adduct of bisphenol A, polyethylene glycol, polypropylene glycol, and polybutylene glycol; tri- or higher-hydric alcohols, such as glycerin, trimethylolethane, trimethylolpropane, diglycerin, triglycerin, 1,2,6-hexanetriol, pentaerythritol, dipentaerythritol, tris(2-hydroxyethyl)isocyanuric acid, sorbitol, and mannitol; polylactone polyol compounds produced by adding a lactone compound such as ε-caprolactone to these tri- or higher-hydric alcohols; and fatty acid ester compounds of glycerin.

Furthermore, an alcohol component other than the polyhydric alcohols described above can be used. Such an alcohol component is not particularly limited, and examples include monoalcohols such as methanol, ethanol, propyl alcohol, butyl alcohol, stearyl alcohol, and 2-phenoxyethanol; and alcohol compounds obtained by reacting an acid with a monoepoxy compound such as a propylene oxide, butylene oxide, and "Cardura E10P" (trade name, glycidyl ester of a synthetic highly-branched saturated fatty acid, available from Hexion Inc.).

The method for producing a hydroxyl group-containing polyester resin (B2) is not particularly limited, and the hydroxyl group-containing polyester resin can be produced according to a typical method. For example, a method can be used in which the acid component and the alcohol component are heated at approximately 150 to 250° C. in a nitrogen stream for approximately 5 to 10 hours, and the acid component and the alcohol component are subjected to an esterification reaction or a transesterification reaction to thereby produce the hydroxyl group-containing polyester resin (B2).

When the acid component and the alcohol component are to be subjected to the esterification reaction or transesterification reaction, these components may be added all at once into a reaction vessel, or one or both components may be added in multiple batches. Also, first, the hydroxyl group-containing polyester resin may be synthesized, and then an acid anhydride may be reacted with the obtained hydroxyl group-containing polyester resin to form a half-ester and obtain a carboxyl group- and hydroxyl group-containing polyester resin. In addition, first, the carboxyl group-containing polyester resin may be synthesized, and then the alcohol component may be added to obtain a hydroxyl group-containing polyester resin.

For the esterification or transesterification reaction, a catalyst known per se can be used as a catalyst for promoting the reaction. Examples of such catalysts include dibutyltin oxide, antimony trioxide, zinc acetate, manganese acetate, cobalt acetate, calcium acetate, lead acetate, tetrabutyl titanate, and tetraisopropyl titanate.

The hydroxyl group-containing polyester resin (B2) can be modified with a fatty acid, a monoepoxy compound, a polyisocyanate compound, or the like during or after preparation of the resin.

Examples of the fatty acid include coconut oil fatty acid, a cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, a dehydrated castor oil fatty acid, and safflower oil fatty acid. Further, as the monoepoxy compound, for example, "Cardura E10P" (trade name, glycidyl ester of a synthetic highly-branched saturated fatty acid, available from Hexion Inc.) can be suitably used.

Moreover, examples of the polyisocyanate compound include aliphatic diisocyanate compounds, such as lysine diisocyanate, hexamethylene diisocyanate, and trimethylhexane diisocyanate; alicyclic diisocyanate compounds, such as hydrogenated xylylene diisocyanate, isophorone diisocyanate, methylcyclohexane-2,4-diisocyanate, methylcyclohexane-2,6-diisocyanate, 4,4'-methylene bis (cyclohexyl isocyanate), and 1,3-(isocyanatomethyl)cyclohexane;

aromatic diisocyanate compounds, such as tolylene diisocyanate, xylylene diisocyanate, and diphenylmethane diisocyanate; organic polyisocyanates themselves, such as trivalent and higher valent polyisocyanates such as lysine triisocyanate; adducts of each of these organic polyisocyanates with a polyhydric alcohol, a low molecular weight polyester resin, water, or the like; and cyclized polymers (for example, isocyanurate) and biuret-type adducts of each of these organic polyisocyanates. These polyisocyanate compounds may be used alone or in combination of two or more types.

From the perspective of achieving excellent smoothness and the like of the multilayer coating film to be formed, the content of the alicyclic polybasic acid in the acid component of the raw materials of the hydroxyl group-containing polyester resin (B2) is preferably in a range of from 20 to 100 mol %, more preferably in a range of from 25 to 95 mol %, and even more preferably in a range of from 30 to 90 mol %, based on the total amount of the acid component. In particular, from the perspective of achieving excellent smoothness and the like of the multilayer coating film to be formed, the alicyclic polybasic acid is preferably a 1,2-cyclohexane dicarboxylic acid and/or a 1,2-cyclohexane dicarboxylic anhydride.

The hydroxyl value of the hydroxyl group-containing polyester resin (B2) is preferably in a range of from 1 to 200 mg KOH/g, more preferably in a range of from 2 to 180 mg KOH/g, and particularly preferably in a range of from 5 to 170 mg KOH/g. When the hydroxyl group-containing polyester resin (B2) further includes a carboxyl group, the acid value thereof is preferably in a range of from 5 to 150 mg KOH/g, more preferably in a range of from 10 to 100 mg KOH/g, and particularly preferably in a range of from 15 to 80 mg KOH/g. The number-average molecular weight of the hydroxyl group-containing polyester resin (B2) is preferably in a range of from 500 to 50000, more preferably in a range of from 1000 to 6000, and particularly preferably in a range of from 1200 to 4000.

When the first water-based paint (P1) contains the hydroxyl group-containing polyester resin (B2), the content of the hydroxyl group-containing polyester resin (B2) in the first water-based paint (P1) is preferably in a range of from 2 to 70 parts by mass, preferably from 5 to 50 parts by mass, and more preferably from 10 to 30 parts by mass, based on 100 parts by mass of the resin solid content in the first water-based paint (P1), from the perspective of metallic unevenness resistance, water resistance, and the like of the coating film to be formed.

<Crosslinking Agent (C)>

The crosslinking agent (C) is a compound having a functional group capable of reacting with a functional group in the film-forming resin (B). In particular, it is preferable that at least one of the functional groups in the film-forming resin (B) is a hydroxyl group, and the crosslinking agent (C) is a compound having a functional group capable of reacting with the hydroxyl group.

Specifically, as the crosslinking agent (C), for example, an amino resin, a polyisocyanate compound, a blocked polyisocyanate compound, or the like can be suitably used. From the perspective of water resistance and the like of the resulting coating film, the crosslinking agent (C) preferably contains an amino resin.

As the amino resin that can be used as the crosslinking agent (C), a partially methylolated amino resin or a completely methylolated amino resin obtained by reaction between an amino component and an aldehyde component can be used. Examples of the amino component include melamine, urea, benzoguanamine, acetoguanamine, steroguanamine, spiroguanamine, and dicyandiamide. Examples of the aldehyde component include formaldehyde, paraformaldehyde, acetaldehyde, and benzaldehyde.

Furthermore, it is possible to use one obtained by partially or completely etherifying methylol groups of the methylolated amino resin with an appropriate alcohol. Examples of the alcohol used for the etherification include methyl alcohol, ethyl alcohol, n-propyl alcohol, isopropyl alcohol, n-butyl alcohol, isobutyl alcohol, 2-ethylbutanol, and 2-ethylhexanol.

When the first water-based paint (P1) contains the amino resin as the crosslinking agent (C), the content proportion thereof is preferably in a range of from 5 to 60 parts by mass, preferably from 15 to 50 parts by mass, and more preferably from 20 to 45 parts by mass based on 100 parts by mass of the resin solid content in the first water-based paint (P1) from the perspective of the smoothness and water resistance of the multilayer coating film to be formed.

The amino resin is preferably a melamine resin (C1). As the melamine resin (C1), for example, an alkyl-etherified melamine resin obtained by partially or completely etherifying methylol groups of a partially or completely methylolated melamine resin with the alcohol can be used.

As the alkyl-etherified melamine resin, for example, a methyl-etherified melamine resin obtained by partially or completely etherifying methylol groups of a partially or completely methylolated melamine resin with methyl alcohol; a butyl-etherified melamine resin obtained by partially or completely etherifying methylol groups of a partially or completely methylolated melamine resin with butyl alcohol; and a methyl-butyl mixed etherified melamine resin obtained by partially or completely etherifying methylol groups of a partially or completely methylolated melamine resin with methyl alcohol and butyl alcohol can be suitably used.

In addition, the melamine resin (C1) preferably has a weight average molecular weight in a range of from 400 to 6000, preferably from 500 to 5000, more preferably from 600 to 4000, and still more preferably from 700 to 3000 from the perspective of sharpness and water resistance of the multilayer coating film to be formed.

As the melamine resin (C1), a commercially available product can be used. Examples of the commercially available product of the melamine resin (C1) include: "CYMEL 202", "CYMEL 203", "CYMEL 238", "CYMEL 251", "CYMEL 303", "CYMEL 323", "CYMEL 324", "CYMEL 325", "CYMEL 327", "CYMEL 350", "CYMEL 385", "CYMEL 1156", "CYMEL 1158", "CYMEL 1116", and "CYMEL 1130" (all available from Allnex Japan Inc.); and "U-VAN 120", "U-VAN 20HS", "U-VAN 20SE60", "U-VAN 2021", "U-VAN 2028", and "U-VAN 28-60" (all available from Mitsui Chemicals, Inc.).

The melamine resins (C1) can be used alone or in combination of two or more thereof.

When the first water-based paint (P1) contains the melamine resin (C1) as the crosslinking agent (C), the content proportion thereof is preferably in a range of from 5 to 60 parts by mass, preferably from 15 to 50 parts by mass, and more preferably from 20 to 45 parts by mass based on 100 parts by mass of the resin solid content in the first water-based paint (P1) from the perspective of the sharpness and water resistance of the coating film to be formed.

The polyisocyanate compound is a compound having at least two isocyanate groups per molecule, and examples thereof include aliphatic polyisocyanate compounds, alicyclic polyisocyanate compounds, aromatic-aliphatic polyisocyanate compounds, aromatic polyisocyanate compounds, and derivatives of the polyisocyanate compounds.

Examples of the aliphatic polyisocyanate compounds include: aliphatic diisocyanate compounds, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and methyl 2,6-diisocyanatohexanoate (common name: lysine diisocyanate); and aliphatic triisocyanate compounds, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane.

Examples of the alicyclic polyisocyanate compound include: alicyclic diisocyanate compounds, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl) cyclohexane (common name: hydrogenated xylylene diisocyanate) or its mixture, methylenebis(4,1-cyclohexanediyl) diisocyanate (common name: hydrogenated MDI), and norbornane diisocyanate; and alicyclic triisocyanate compounds, such as 1,3,5-triisocyanatocyclohexane, 1,3,5-trimethylisocyanatocyclohexane, 2-(3-isocyanatopropyl)-2,5-di (isocyanatomethyl)-bicyclo(2.2.1)heptane, 2-(3-isocyanatopropyl)-2,6-di(isocyanatomethyl)-bicyclo(2.2.1) heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1) heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane, and 6-(2-isocyanatoethyl)-2-isocyanatomethyl-2-(3-isocyanatopropyl)-bicyclo(2.2.1)heptane.

Examples of the aromatic-aliphatic polyisocyanate compound include: aromatic-aliphatic diisocyanate compounds, such as methylenebis(4,1-phenylene) diisocyanate (common name: MDI), 1,3- or 1,4-xylylene diisocyanate or its mixture, ω,ω'-diisocyanato-1,4-diethylbenzene, and 1,3- or 1,4-bis(1-isocyanato-1-methylethyl)benzene (common name: tetramethylxylylene diisocyanate) or its mixture; and aromatic-aliphatic triisocyanate compounds, such as 1,3,5-triisocyanatomethylbenzene.

Examples of the aromatic polyisocyanate compound include: aromatic diisocyanate compounds, such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI) or 2,6-tolylene diisocyanate (common name: 2,6-TDI) or its mixture, 4,4'-toluidine diisocyanate, and 4,4'-diphenyl ether diisocyanate; aromatic triisocyanate compounds, such as triphenylmethane-4,4',4"-triisocyanate, 1,3,5-triisocyanatobenzene, and 2,4,6-triisocyanatotoluene; and aromatic tetraisocyanate compounds, such as 4,4'-diphenylmethane-2,2',5,5'-tetraisocyanate.

In addition, examples of the derivative of the polyisocyanate compound include dimers, trimers, biuret, allophanate, uretdione, uretoimine, isocyanurates, oxadiazinetrione, polymethylene polyphenyl polyisocyanates (crude MDI and polymeric MDI), and crude TDI of the polyisocyanate compounds described above.

The polyisocyanate compounds and their derivatives may each be used alone or in combination of two or more types.

As the polyisocyanate compound, it is preferable to use at least one selected from aliphatic polyisocyanate compounds, alicyclic polyisocyanate compounds, and derivatives thereof from the perspective of weather resistance and the like of the coating film to be formed, and it is more preferable to use an aliphatic polyisocyanate compound and/or a derivative thereof from the perspective of finished appearance, and the like of the coating film to be formed.

As the aliphatic polyisocyanate compound and/or the derivative thereof, it is preferable to use an aliphatic diisocyanate compound and/or an isocyanurate thereof, and it is more preferable to use hexamethylene diisocyanate and/or an isocyanurate thereof, from the perspective of finished appearance and the like of the coating film to be formed.

When the first water-based paint (P1) contains the polyisocyanate compound as the crosslinking agent (C), the content proportion of the polyisocyanate compound is preferably in a range of from 2 to 60 parts by mass, preferably from 3 to 50 parts by mass, and more preferably from 5 to 45 parts by mass based on 100 parts by mass of the resin solid content in the first water-based paint (P1) from the perspective of the sharpness and water resistance of the multilayer coating film to be formed.

The blocked polyisocyanate compound that can be used as the crosslinking agent (C) is a compound formed by blocking an isocyanate group in the polyisocyanate compound with a blocking agent.

Examples of the blocking agent include: phenolic compounds, such as phenol, cresol, xylenol, nitrophenol, ethylphenol, hydroxydiphenyl, butylphenol, isopropylphenol, nonylphenol, octylphenol, and methyl hydroxybenzoate; lactam-based compounds, such as ε-caprolactam, δ-valerolactam, γ-butyrolactam, and β-propiolactam; aliphatic alcohol-based compounds, such as methanol, ethanol, propyl alcohol, butyl alcohol, amyl alcohol, and lauryl alcohol; ether-based compounds, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohol-based compounds, such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oxime-based compounds, such as formamide oxime, acetoamide oxime, acetoxime, methyl ethyl ketoxime, diacetyl monoxime, benzophenone oxime, and cyclohexane oxime; active methylene-based compounds, such as dimethyl malonate, diethyl malonate, ethyl acetoacetate, methyl acetoacetate, and acetylacetone; mercaptan-based compounds, such as butyl mercaptan, t-butyl mercaptan, hexyl mercaptan, t-dodecyl mercaptan, 2-mercaptobenzothiazole, thiophenol, methylthiophenol, and ethylthiophenol; acid amide-based compounds, such as acetanilide, acetanisidide, acetotoluide, acrylamide, methacrylamide, acetic amide, stearic amide, and benzamide; imide-based compounds, such as succinimide, phthalimide, and maleimide; amine-based compounds, such as diphenylamine, phenylnaphthylamine, xylidine, N-phenylxylidine, carbazole, aniline, naphthylamine, butylamine, dibutylamine, and butylphenylamine; imidazole-based compounds, such as imidazole and 2-ethylimidazole; urea-based compounds, such as urea, thiourea, ethyleneurea, ethylenethiourea, and diphenylurea; carbamic ester-based compounds, such as phenyl N-phenylcarbamate; imine-based compounds, such as ethyleneimine and propyleneimine; sulfite-based compounds, such as sodium bisulfite and potassium bisulfite; and azole-based compounds. Examples of the azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; and imidazoline derivatives, such as 2-methylimidazoline and 2-phenylimidazoline.

Particularly, preferred examples of the blocking agent include oxime-based blocking agents, active methylene-based blocking agents, and pyrazole or pyrazole derivatives.

In blocking (blocking agent is subjected to reaction), a solvent can be added as necessary. The solvent used in the blocking reaction is preferably a solvent not reactive with an isocyanate group, and examples include ketones, such as acetone and methyl ethyl ketone; esters, such as ethyl acetate; and a solvent such as N-methyl-2-pyrrolidone (NMP).

When the first water-based paint (P1) contains the blocked polyisocyanate compound as the crosslinking agent (C), the content proportion of the blocked polyisocyanate compound is preferably in a range of from 2 to 60 parts by mass, preferably from 3 to 50 parts by mass, and more preferably from 5 to 45 parts by mass based on 100 parts by mass of the resin solid content in the first water-based paint (P1) from the perspective of the sharpness and water resistance of the multilayer coating film to be formed.

When the first water-based paint (P1) contains a polyisocyanate compound and/or a blocked polyisocyanate compound as the crosslinking agent (C), the content ratio thereof is preferably such that the equivalent ratio (NCO/OH) of the total isocyanate groups (including blocked isocyanate groups) of the polyisocyanate compound and the blocked polyisocyanate compound to the total amount of hydroxyl groups of the compound (A) (for example, an acrylic resin (A1) containing a hydroxyl group and an acid group) containing a hydroxyl group and an acid group and the film-forming resin (B) is usually within a range of from 0.5 to 2, particularly from 0.8 to 1.5, from the perspective of the sharpness and water resistance of the coating film to be formed.

The crosslinking agents (C) can be used alone or in combination of two or more thereof.

The first water-based paint (P1) preferably further contains a pigment. Examples of the pigment include color pigments, effect pigments, and extender pigments.

When the first water-based paint (P1) contains the color pigment, the color pigment is not particularly limited, and one or a combination of two or more known color pigments can be selected as in the case of the intermediate paint.

As the color pigment, carbon black is preferably used as at least one of the color pigments from the perspective of improving the distinguishability of the coated part of the first water-based paint (P1) and suppressing the light transmittance of the first coating film formed by the first water-based paint (P1). When a multilayer coating film having a white pearl color is formed, the first water-based paint (P1) preferably contains a titanium dioxide pigment as at least one of the color pigments.

When the first water-based paint (P1) contains the color pigment, the content of the color pigment is preferably in a range of from 0.003 to 150 parts by mass, more preferably in a range of from 0.005 to 140 parts by mass, and still more preferably in a range of from 0.03 to 130 parts by mass, based on 100 parts by mass of the total solid content of the binder component (the compound (A), the film-forming resin (B), and the crosslinking agent (C)) in the first water-based paint (P1).

When the first water-based paint (P1) contains the effect pigment described above, the effect pigment is not particularly limited, and one type of a known effect pigment can be used alone, or two or more types can be combined and used. As the effect pigment, for example, an effect pigment described in the explanation of an effect pigment ($B_{P2}$) in a second water-based coloring paint (P2) described below can be used. As the effect pigment, it is preferable to select at least one effect pigment selected from the group consisting of an aluminum flake pigment, a deposited aluminum flake pigment, a coloring aluminum flake pigment, a metal oxide-coated mica pigment, and a metal oxide-coated aluminum oxide flake pigment from the perspective of brightness, smoothness, sharpness, and the like of the multilayer coating film to be formed, and among them, it is preferable to select an aluminum flake pigment and/or a metal oxide-coated aluminum oxide flake pigment.

When the first water-based paint (P1) contains the effect pigment described above, the content of the effect pigment is preferably in a range of from 0.1 to 20 parts by mass, more preferably in a range of from 0.5 to 18 parts by mass, and particularly preferably in a range of from 1 to 16 parts by mass, based on 100 parts by mass of the total solid content of the binder component in the first water-based paint (P1).

When the first water-based paint (P1) contains the extender pigment described above, the extender pigment is not particularly limited, and one type of a known extender pigment can be used alone, or two or more types can be combined and selected. Examples of the extender pigment include barium sulfate, barium carbonate, calcium carbonate, talc, and silica. From the perspective of brightness, smoothness, chipping resistance or the like of the multilayer coating film that is formed, barium sulfate and/or talc is preferably selected as at least one type of extender pigment, and from perspectives such as the brightness and smoothness of the multilayer coating film that is formed, barium sulfate is more preferably selected.

When the first water-based paint (P1) contains the extender pigment described above, the content of the extender pigment is preferably in a range of from 0.1 to 30 parts by mass, more preferably in a range of from 2.5 to 25 parts by mass, and still more preferably in a range of from 5 to 20 parts by mass, based on 100 parts by mass of the total solid content of the binder component in the first water-based paint (P1).

It is preferable that the first water-based paint (P1) further contains a hydrophobic organic solvent from the perspective of smoothness, sharpness, crack resistance, brightness, and the like of the multilayer coating film to be formed.

The hydrophobic organic solvent is desirably an organic solvent having a mass dissolved in 100 g of water at 20° C. of 10 g or less, preferably 5 g or less, and more preferably 1 g or less. Examples of such hydrophobic organic solvents include alcohol-based hydrophobic organic solvents, such as 1-hexanol, 1-octanol, 2-octanol, 2-ethyl-1-hexanol, 1-decanol, benzyl alcohol, ethylene glycol mono-2-ethylhexyl ether, propylene glycol mono-n-butyl ether, dipropylene glycol mono-n-butyl ether, tripropylene glycol mono-n-butyl ether, propylene glycol mono-2-ethylhexyl ether, and propylene glycol mono-phenyl ether; hydrocarbon-based hydrophobic organic solvents, such as rubber volatile oil, mineral spirits, toluene, xylene, and solvent naphtha; ester-based hydrophobic organic solvents, such as n-butyl acetate, isobutyl acetate, isoamyl acetate, methylamyl acetate, ethylene glycol monobutyl ether acetate; and ketone-based hydrophobic organic solvents, such as methyl isobutyl ketone, cyclohexanone, ethyl n-amyl ketone, and diisobutyl ketone. These hydrophobic organic solvents can be used alone or in a combination of two or more types.

From the perspective of improving the smoothness, sharpness, and brightness of the resulting multilayer coating film, as at least one type of the hydrophobic organic solvent, an alcohol-based hydrophobic organic solvent is preferably contained, and an alcohol-based hydrophobic organic solvent of an alcohol having from 7 to 14 carbons is more preferably contained. In particular, it is preferable to contain, among these hydrophobic organic solvents, at least one type of alcohol-based hydrophobic organic solvent selected from the group consisting of 1-octanol, 2-octanol, 2-ethyl-1-hexanol, ethylene glycol mono-2-ethylhexyl ether, propylene glycol mono-n-butyl ether and dipropylene glycol mono-n-butyl ether, and more preferably at least one type of alcohol-based hydrophobic organic solvent selected from the group consisting of 1-octanol, 2-ethyl-1-hexanol and ethylene glycol mono-2-ethylhexyl ether. In particular, it is preferable to contain 2-ethyl-1-hexanol and/or ethylene glycol mono-2-ethylhexyl ether, and particularly preferably 2-ethyl-1-hexanol.

When the water-based paint composition of the present invention contains the hydrophobic organic solvent, the content of the hydrophobic organic solvent is preferably in a range of from 2 to 70 parts by mass, more preferably in a range of from 11 to 60 parts by mass, still more preferably in a range of from 16 to 50 parts by mass, and still more preferably in a range of from 21 to 45 parts by mass, based on 100 parts by mass of the total solid content of the binder component in the first water-based paint (P1).

The first water-based paint (P1) can contain various additives such as a thickener, a curing catalyst, an antifoaming agent, an antioxidant, an ultraviolet absorber, a light stabilizer, a surface conditioner, and a pigment dispersant as desired.

Examples of the thickener include acrylic associative thickeners, such as an acrylic resin having a hydrophilic moiety and a hydrophobic moiety, preferably an acrylic resin having a hydrophilic acrylic main chain and a hydrophobic side chain; urethane associative thickeners having a hydrophobic moiety, a urethane bond, and a polyether chain per molecule, and effectively exhibiting, in an aqueous medium, a thickening action through association of the hydrophobic moieties (examples of commercially available urethane associative thickeners include "ADEKA NOL UH-814N", "ADEKA NOL UH-462", "ADEKA NOL UH-420", "ADEKA NOL UH-472", "ADEKA NOL UH-540", and "ADEKA NOL UH-756VF" available from ADEKA CORPORATION, and "SN Thickener 612", "SN Thickener 621N", "SN Thickener 625N", and "SN Thickener 627N" available from San Nopco Ltd.); inorganic thickeners, such as silicates, metal silicates, montmorillonite, organic montmorillonite, and colloidal alumina; polyacrylic acid-based thickeners, such as sodium polyacrylate, and polyacrylic acid-(meth)acrylate copolymers; cellulose derivative-based thickeners, such as carboxymethyl cellulose, methyl cellulose, and hydroxyethyl cellulose; protein-based thickeners, such as casein, sodium caseinate, and ammonium caseinate; alginic acid-based thickeners, such as sodium alginate; polyvinyl-based thickeners, such as polyvinyl alcohol, polyvinylpyrrolidone, and polyvinyl benzyl ether copolymers; polyether-based thickeners, such as pluronic polyether, polyether dialkyl ester, polyether dialkyl ether, and polyether epoxy-modified products; maleic anhydride copolymer-based thickeners, such as partial esters of vinyl methyl ether-maleic anhydride copolymers; and polyamide-based thickeners, such as polyamide amine salts. Of these thickeners, use of an acrylic associative thickener and/or a urethane associative thickener is preferable, and use of an acrylic associative thickener is particularly preferable. These thickeners can be used alone or in combination of two or more thereof.

The first water-based paint (P1) can be prepared by dissolving or dispersing the aforementioned components in water or a medium (aqueous medium) containing water as a main component. The paint solid content concentration ($NV_{P1}$) of the first water-based paint (P1) is appropriately within a range of from 16 to 60 mass %, preferably within a range of from 18 to 40 mass %, and more preferably within a range of from 20 to 35 mass % from the perspective of metallic unevenness resistance, smoothness, brightness, and the like.

As necessary, the first water-based paint (P1) can be applied using a known coating method, such as electrostatic coating, air spraying, or air-less spraying. The film thickness of the first coating film formed from the first water-based paint (P1) is, in terms of a cured film thickness ($T_{P1}$), in a range of from 5 to 20 μm, preferably in a range of from 6 to 16 μm, and more preferably in a range of from 8 to 14 μm.

Adjusting the film thickness of the first coating film formed by the first water-based paint (P1) within a certain range makes it possible to form a multilayer coating film excellent in metallic unevenness resistance, smoothness, and brightness together with the intermediate coating film and the second coloring coating film formed on and under the first water-based paint (P1).

The method for forming a multilayer coating film of the present invention has an advantage that a multilayer coating film excellent in metallic unevenness resistance can be formed even when the first coating film is formed by applying the first water-based paint (P1) in a relatively low-humidity environment.

Specifically, the relatively low-humidity environment is, for example, an environment in which the relative humidity is within a range of 65% RH or less, preferably from 55 to 65% RH, and preferably from 55 to 60% RH when the temperature is 23° C.

The first coating film is subjected to the formation of a second coloring coating film in the following (2) second coloring coating film forming step in an uncured state, and is heated and cured together with the first coating film, the second coloring coating film, and the clear coat coating film formed in (1) first coating film forming step to (3) clear coat coating film forming step in (4) multilayer coating film curing step described later. As necessary, before forming the second coloring coating film in the next (2) second coloring coating film forming step, heating may be directly or indirectly performed at a temperature of from about 40 to about 100° C., preferably from about 50 to about 90° C. for about 30 seconds to 20 minutes by preheating, air blowing, or the like. In particular, it is preferable not to perform heating between (1) first coating film forming step and (2) second coloring coating film forming step from the perspective of reducing the use energy, shortening the coating line, adhesion of the multilayer coating film to be formed, and the like.

[(1a) Electrodeposition Coating Film Forming Step]

In (1a) electrodeposition coating film forming step, which is performed as desired, an electrodeposition paint is applied onto a steel sheet to form an electrodeposition coating film, and the electrodeposition coating film is heated and cured to form a cured electrodeposition coating film.

Examples of the steel sheet used as the substrate include cold-rolled steel sheets, alloyed hot-dip galvanized steel sheets, electro-galvanized steel sheets, zinc-iron two-layer electro-plated steel sheets, organic composite plated steel sheets, Al materials, and Mg materials. As necessary, the surfaces of these metal sheets may be cleaned through alkaline degreasing or the like and then subjected to a surface treatment such as phosphate chemical treatment, a chromate treatment, or a composite oxide treatment.

The electrodeposition paint used in this step is preferably a thermosetting water-based paint that is commonly used in the relevant field, and a cationic electrodeposition paint or anionic electrodeposition paint can be used. The electrodeposition paint is preferably a water-based paint containing a base resin and a crosslinking agent, and an aqueous medium including water and/or a hydrophilic organic solvent.

From the perspective of rust prevention, for example, an epoxy resin, an acrylic resin, a polyester resin, or the like is preferably used as the base resin. Of these, from the perspective of rust prevention, a resin having an aromatic ring is preferably used as at least one type of the base resin, and of such resins, an epoxy resin having an aromatic ring is preferably used. A blocked polyisocyanate compound, an amino resin, or the like is preferably used as the crosslinking agent, for example. Here, examples of the hydrophilic organic solvent include methanol, ethanol, n-propyl alcohol, isopropyl alcohol, and ethylene glycol. A coating film having high rust prevention can be obtained by applying the electrodeposition paint.

In this step, as the means for applying the electrodeposition paint onto the steel sheet, an electrodeposition coating method that is commonly used in the relevant field can be used. According to this coating method, a coating film having high rust prevention can be formed across substantially the entire surface of the object to be coated, even with an object that has been subjected to a forming process in advance.

In order to prevent the generation of a mixed layer with the coating film formed on the electrodeposition coating film formed in this step and improve the coated appearance of the multilayer coating film obtained as a result, a thermosetting electrodeposition paint is applied, and then the uncured coating film is baked and cured by heating. In the present specification, a "cured electrodeposition coating film" means a coating film obtained by heating and curing the electrodeposition coating film formed on the steel sheet.

In general, when the baking treatment is implemented at a temperature above 190° C., the coating film becomes too hard and brittle, and conversely, when the baking treatment is implemented at a temperature lower than 110° C., the reaction of the above components is insufficient, neither of which is preferable. Therefore, in this step, the temperature of the baking treatment of the uncured electrodeposition coating film is generally in a range of from 110 to 190° C., and particularly preferably in a range of from 120 to 180° C. Furthermore, usually, the baking treatment time is preferably from 10 to 60 minutes. A cured electrodeposition coating film can be obtained in a dry state by implementing the baking treatment under the conditions described above.

Furthermore, the dry film thickness of the cured electrodeposition coating film after the baking treatment under the conditions described above is usually preferably in a range of from 5 to 40 μm and particularly preferably in a range of from 10 to 30 μm.

Rust prevention of the coated steel sheet can be improved by forming the electrodeposition coating film in the manner described above.

[(1b) Intermediate Coating Film Forming Step]

In (1b) intermediate coating film forming step, which is performed as desired, an intermediate paint is applied onto the cured electrodeposition coating film to form an intermediate coating film.

The intermediate paint is typically a paint containing a binder component and a color pigment, and by forming an intermediate coating film using the intermediate paint, it is possible to form a multilayer coating film having suppressed metallic unevenness and excellent smoothness, impact resistance, brightness, and water resistance together with the first coating film formed of the first water-based paint (P1) and the second coloring coating film formed of the second water-based coloring paint (P2).

As the intermediate paint, a paint containing a binder component and a color pigment can be used. As the binder component used in the intermediate paint, a coating film-forming resin composition commonly used in an intermediate paint can be used. Examples of such a resin composition include a resin composition in which a crosslinking agent is used in combination with a base resin having a crosslinkable functional group such as a hydroxyl group. Examples of the base resin include an acrylic resin, a polyester resin, an alkyd resin, and a urethane resin. Examples of the crosslinking agent include amino resins such as melamine resin and urea resin, or polyisocyanate compounds (including a blocked polyisocyanate compound). The proportion of the base resin and the crosslinking agent in the resin composition is not particularly limited, but the crosslinking agent can usually be used in a range of from 10 to 100 mass %, preferably from 20 to 80 mass %, and more preferably from 30 to 60 mass % relative to the total amount of the base resin solid content. The base resin and the curing agent can be used by dissolving or dispersing them in a solvent such as an organic solvent and/or water.

The color pigment used in the intermediate paint is not particularly limited, and one type of a known color pigment can be used alone, or two or more types can be combined and used. Specific examples of the color pigments that can be used include composite metal oxide pigments, such as a titanium dioxide pigment, an iron oxide pigment, and titanium yellow, azo-based pigments, quinacridone-based pigments, diketopyrrolopyrrole-based pigments, perylene-based pigments, perinone-based pigments, benzimidazolone-based pigments, isoindoline-based pigments, isoindolinone-based pigments, azo metal chelate-based pigments, phthalocyanine-based pigments, indanthrone-based pigments, dioxane-based pigments, threne-based pigments, indigo-based pigments, and carbon black pigments. From the perspective of properties such as the weather resistance of the formed multilayer coating film, a titanium dioxide pigment or a carbon black pigment is preferably used as at least one of the color pigments used in the intermediate paint.

The content of the color pigment in the intermediate paint is preferably in a range of from 0.01 to 150 parts by mass, more preferably in a range of from 0.02 to 140 parts by mass, and particularly preferably in a range of from 0.03 to 130 parts by mass, based on 100 parts by mass of the total solid content of the binder component in the intermediate paint.

When the intermediate paint contains the titanium dioxide pigment described above, the content of the titanium dioxide pigment is preferably in a range of from 5 to 150 parts by mass, more preferably in a range of from 6 to 140 parts by mass, and particularly preferably in a range of from 7 to 130 parts by mass, based on 100 parts by mass of the total solid content of the binder component in the intermediate paint.

When the intermediate paint contains the carbon black pigment described above, the content of the carbon black pigment is preferably in a range of from 0.01 to 3 parts by mass, more preferably in a range of from 0.02 to 2.5 parts by mass, and particularly preferably in a range of from 0.03 to 2.0 parts by mass, based on 100 parts by mass of the total solid content of the binder component in the intermediate paint.

As necessary, a solvent such as water or an organic solvent, various additives such as a pigment dispersing agent, a curing catalyst, a defoaming agent, an antioxidant, a UV absorber, a light stabilizer, a thickener, and a surface conditioner, effect pigments such as an aluminum pigment, and extender pigments such as barium sulfate, barium carbonate, calcium carbonate, talc, and silica can be appropriately compounded in the intermediate paint.

The intermediate paint may be a water-based paint or an organic solvent-based paint, but from the perspective of reducing VOCs, the intermediate paint is preferably a water-based paint. Here, a water-based paint is a term that is used in contrast with an organic solvent-based paint, and ordinarily means a paint obtained by dispersing and/or dissolving a binder component, a pigment, and the like in water or a medium (aqueous medium) containing water as a main component. When the intermediate paint is a water-based paint, the content of water in the intermediate paint is preferably approximately from 20 to 80 mass %, and more preferably approximately from 30 to 60 mass %.

The intermediate paint can be prepared by mixing and dispersing the aforementioned components. A paint solid content concentration (NV) of the intermediate paint is preferably adjusted to a range of from 30 to 60 mass %, and more preferably a range of from 40 to 55 mass %.

The intermediate paint can be adjusted to have an appropriate viscosity for application by adding water, an organic solvent, or the like, and then applied, as necessary, by a known method such as rotary atomization coating, air spraying, and airless spraying. From the perspective of smoothness and the like of the multilayer coating film, the intermediate paint is applied such that based on the cured film thickness, the film thickness is in a range of preferably from 10 to 40 μm, more preferably from 15 to 35 μm, and even more preferably from 20 to 30 μm.

In the intermediate paint, the L* value which is the lightness in the L*a*b* color system when a cured coating film having a thickness of 30 μm is formed is not particularly limited, but is usually 1 or more and 95 or less. In particular, from the perspective of flip-flop property of the multilayer coating film to be formed, the intermediate paint preferably has an L* value, which is lightness in the L*a*b* color system when a cured coating film having a thickness of 30 μm is formed, of from 1 to 90, more preferably from 2 to 85, and still more preferably from 3 to 80.

The L*a*b* color system is a color system that was standardized by the International Commission on Illumination (CIE) in 1976, and was adopted in Japan as well in JIS Z 8784-1. In the L*a*b* color system, the lightness is expressed as L*, and the chromaticity, which indicates hue and chroma, is expressed as a* and b*. A positive value of a* indicates a red direction (whereas a negative value of a* indicates a green direction), and a positive value of b* indicates a yellow direction (whereas a negative value of b* indicates a blue direction). In the present specification, L*, a* and b* are defined as numerical values calculated from the spectral reflectance of light received at 90 degrees in relation to the surface of the coating film when light irradiates the coating film at 45 degrees in relation to a vertical axis of the coating film, the spectral reflectance being obtained using the CM-512m3 multi-angle spectrophotometer (trade name, available from Konica Minolta, Inc.).

When an object to be coated on which an intermediate coating film is formed is used as the object to be coated, the intermediate coating film may be heated and cured prior to the formation of the first coating film which is the next step, or may be subjected to the formation of the first coating film which is the next step (1) in an uncured state, then heated and cured together with the first coating film, the second coloring coating film, and the clear coat coating film formed in the steps (1) to (3) in the step (4) described later. From the perspective of sag resistance and the like, the intermediate coating film is preferably heated and cured prior to the formation of the first coating film in the next step. From the perspective of reducing the use energy and the like, it is preferable that the intermediate coating film is subjected to the formation of the first coating film as the next step (1) in an uncured state, and in the step (4) described later, the intermediate coating film is heated and cured together with the first coating film, the second coloring coating film, and the clear coat coating film formed in the steps (1) to (3). As necessary, before the formation of the first coating film in the next step (1), the obtained uncured intermediate coating film may be dried to an extent that it is not substantially cured, or the solid content may be adjusted to an extent that it is not dried, by means of preheating, air blowing, or the like. The preheating can be performed by a known heating means, and for example, a drying furnace such as a hot air furnace, an electric furnace, or an infrared induction heating furnace can be used.

The preheating can usually be performed by directly or indirectly heating the object coated with the intermediate paint in a drying furnace at a temperature of from 40 to 100° C., preferably from 50 to 90° C., and more preferably from 60 to 80° C. for 30 seconds to 20 minutes, preferably from 1 to 15 minutes, and more preferably from 2 to 10 minutes. The air blowing can be performed, usually, by blowing air of normal temperature or heated to a temperature of from about 25° C. to about 80° C. on the coated surface of the coated object for approximately 30 seconds to 15 minutes.

In the present invention, the cured coating film is a coating film in a cured and dried state defined in JIS K 5600-1-1:1999, that is, a state in which the center of the coating surface is strongly sandwiched between the thumb and the index finger, no indentation is formed on the coating surface by fingerprints, and no movement of the coating film is felt, and when the center of the coating film is rapidly and repeatedly rubbed with a fingertip, no scratches are formed on the coating surface. On the other hand, the uncured coating film is a state in which the coating film has not reached the above-described cured and dried state, and includes a set-to-touch state and a semi-cured and dried state defined in JIS K 5600-1-1:1999.

When an object in which an uncured intermediate coating film is formed is used as an object to be coated, the uncured intermediate coating film is preferably subjected to the preheating between the intermediate coating film forming step and the step (1) from the perspective of the metallic unevenness resistance, sagging resistance, sharpness, brightness, and the like of the multilayer coating film to be formed. On the other hand, from the perspective of reducing the use energy, shortening the coating line, and the like, it is preferable not to perform the preheating on the uncured intermediate coating film between the intermediate coating film forming step and the step (1).

[(2) Second Coloring Coating Film Forming Step]

In (2) second coloring coating film forming step, a second water-based coloring paint (P2) that is a water-based paint is applied onto the uncured first coating film obtained in the (1) first coating film forming step to form a second coloring coating film having a cured film thickness ($T_{P2}$) in a range of from 0.5 to 7 μm. Here, the second water-based coloring paint (P2) is a water-based coloring paint containing a binder component ($A_{P2}$) and an effect pigment ($B_{P2}$), and has a specific paint solid content concentration ($NV_{P2}$).

As the binder component ($A_{P2}$) used in the second water-based coloring paint (P2), a resin composition containing a coating film-forming resin commonly used in paints can be used. As such a resin composition, a thermosetting resin composition can be suitably used, and specifically, for example, a thermosetting resin composition in which a base resin having a crosslinkable functional group such as a hydroxyl group is used in combination with a curing agent can be used. Examples of the base resin having a crosslinkable functional group include an acrylic resin, a polyester resin, an alkyd resin, and a urethane resin, and examples of the crosslinking agent include a melamine resin, a urea resin, and a polyisocyanate compound (including a blocked polyisocyanate compound).

Of these, from the perspectives of brightness and smoothness of the multilayer coating film that is formed, as at least one type, the base resin preferably includes at least one type of resin selected from a hydroxyl group-containing acrylic resin, a hydroxyl group-containing polyester resin, and a urethane resin, more preferably includes at least one type of resin selected from a hydroxyl group-containing acrylic resin and a hydroxyl group-containing polyester resin, and particularly preferably includes a hydroxyl group-containing acrylic resin.

The effect pigment ($B_{P2}$) blended in the second water-based coloring paint (P2) is a pigment that is used for the purpose of imparting brightness to the coating film. The effect pigment ($BP_2$) is preferably a scale-shaped pigment. Such an effect pigment is not particularly limited, and one type of various effect pigments used in the paint field can be used, or two or more types thereof can be combined and adopted. Specific examples of such effect pigments include aluminum flake pigments, vapor-deposited aluminum flake pigments, metal oxide-coated aluminum flake pigments, coloring aluminum flake pigments, metal oxide-coated mica pigments, metal oxide-coated aluminum oxide flake pigments, metal oxide-coated glass flake pigments, and metal oxide-coated silica flake pigments. Also, for example, titanium oxide, iron oxide, and the like can be exemplified as the metal oxide that covers the effect pigment.

From the perspective of metallic unevenness resistance, brightness, and smoothness of the multilayer coating film to be formed, at least one type of effect pigment selected from the group consisting of aluminum flake pigments, vapor-deposited aluminum flake pigments, coloring aluminum flake pigments, metal oxide-coated mica pigments, and metal oxide-coated aluminum oxide flake pigments is preferably included as the effect pigment ($B_{P2}$). Of these, the effect pigment ($B_{P2}$) preferably contains at least one effect pigment selected from the group consisting of an aluminum flake pigment, a vapor-deposited aluminum flake pigment, and a coloring aluminum flake pigment, more preferably contains an aluminum flake pigment and/or a vapor-deposited aluminum flake pigment, and particularly preferably contains an aluminum flake pigment, from the perspective of particularly excellent metallic unevenness resistance of the multilayer coating film to be formed.

From the perspective of brightness, sharpness, and smoothness of the multilayer coating film to be formed, the content proportions of the binder component ($A_{P2}$) and the effect pigment ($BP_2$) in the second water-based coloring paint (P2) is such that based on 100 parts by mass of the solid content of the binder component ($A_{P2}$), the content of the effect pigment ($B_{P2}$) is preferably in a range of from 5 to 550 parts by mass, more preferably in a range of from 15 to 400 parts by mass, and particularly preferably in a range of from 20 to 350 parts by mass.

Also, in the second water-based coloring paint (P2), from the perspective of brightness, sharpness, and smoothness of the multilayer coating film to be formed, the content proportion of the effect pigment ($B_{P2}$) in the second water-based coloring paint (P2) is, based on the paint solid content in the second water-based coloring paint (P2), preferably in a range of from 4 to 85 mass %, more preferably in a range of from 10 to 80 parts by mass, and particularly preferably in a range of from 15 to 75 parts by mass.

The second water-based coloring paint (P2) can further contain, as desired, various additives such as a curing catalyst, a defoaming agent, an antioxidant, a UV absorber, a light stabilizer, a thickener, a surface conditioner, and a pigment dispersing agent, and pigments other than the effect pigment ($B_{P2}$), such as a color pigment and an extender pigment, can be blended, as appropriate and as necessary into the second water-based coloring paint (P2).

The second water-based coloring paint (P2) can be prepared by dissolving or dispersing the aforementioned components in water or a medium (aqueous medium) containing water as a main component. In the second water-based coloring paint (P2), the paint solid content concentration ($NV_{P2}$) is in a range of 1 mass % or more and less than 20 mass %. An effect of obtaining a multilayer coating film with excellent metallic unevenness resistance, brightness, and smoothness can be obtained by adjusting the paint solid content concentration ($NV_{P2}$) to within this range. From the perspective of the metallic unevenness resistance, brightness, smoothness and the like of the multilayer coating film to be formed, the paint solid content concentration ($NV_{P2}$) is preferably in a range of from 2 to 17 mass %, more preferably in a range of from 3 to 16 mass %. Within this range, the concentration is preferably within a range of from 4 to 15 mass %, and particularly preferably within a range of from 5 to 14 mass %.

As necessary, the second water-based coloring paint (P2) can be applied using a known coating method, such as electrostatic coating, air spraying, or air-less spraying.

The film thickness of the second coloring coating film formed from the second water-based coloring paint (P2) is, in terms of a cured film thickness ($T_{P2}$), in a range of from 0.5 to 7 μm, preferably in a range of from 0.7 to 5 μm, more preferably in a range of from 0.9 to 4 μm, and still more preferably in a range of from 2 to 4 μm. Adjusting the film thickness of the second coloring coating film formed from the second water-based coloring paint (P2) to within this certain range makes it possible to form a multilayer coating film having excellent metallic unevenness resistance, smoothness, and brightness along with the first coloring coating film.

The second coating film is subjected to the formation of a clear coat coating film in the following (3) clear coat coating film forming step in an uncured state, and is heated and cured together with the first coating film, the second coloring coating film, and the clear coat coating film formed in (1) first coating film forming step to (3) clear coat coating film forming step in (4) multilayer coating film curing step described later. As necessary, before forming the clear coat coating film in the (3) clear coat coating film forming step, the second coloring coating film may be dried to such an extent that the second coloring coating film is not substantially cured, or the solid content may be adjusted to such an extent that the second coloring coating film is not dried, by means such as preheating or air blowing.

The preheating can be performed by a known heating means, and for example, a drying furnace such as a hot air furnace, an electric furnace, or an infrared induction heating furnace can be used. The preheating can ordinarily be implemented by directly or indirectly heating the object coated with the second water-based coloring paint (P2) in a drying furnace at a temperature of from 40 to 100° C., preferably from 50 to 90° C., and more preferably from 60 to 80° C. for 30 seconds to 20 minutes, preferably 1 to 15 minutes, and more preferably 2 to 10 minutes.

The air blowing can be performed, usually, by blowing air of normal temperature or heated to a temperature of from about 25° C. to about 80° C. on the coated surface of the coated object for approximately 30 seconds to 15 minutes.

In particular, from the perspective of metallic unevenness resistance, sharpness, smoothness, brightness, and the like of the multilayer coating film to be formed, the preheating is preferably performed between the step (2) and the step (3).

[(3) Clear Coat Coating Film Forming Step]

In (3) clear coat coating film forming step, a clear coat paint (P3) is applied onto the uncured second coloring coating film formed in (2) second coloring coating film forming step to form a clear coat coating film.

As the clear coat paint (P3), for example, a known clear coat paint ordinarily used to paint a vehicle body can be used, and specific examples include organic solvent-based thermosetting paints, water-based thermosetting paints, and thermosetting powdered paints, containing, as vehicle components, a base resin having a crosslinkable functional group such as a hydroxyl group, a carboxyl group, an epoxy group, or a silanol group, and a curing agent. Examples of the base resin include an acrylic resin, a polyester resin, an alkyd resin, a urethane resin, an epoxy resin, and a fluororesin, and examples of the crosslinking agent include melamine resin, urea resin, a polyisocyanate compound that may be blocked, a carboxyl group-containing compound or resin, and an epoxy group-containing compound or resin. Among these, an organic solvent-based thermosetting paint containing a carboxyl group-containing resin and an epoxy group-containing resin, or a thermosetting paint containing a hydroxyl group-containing acrylic resin and a polyisocyanate compound that may be blocked is suitable. The clear coat paint may be a one-component paint or a two-component paint, such as a two-component urethane resin paint.

The clear coat paint (P3) described above may further contain, as desired, to the extent that the transparency is not inhibited, a color pigment, an effect pigment, a dye, a matting agent, an extender pigment, a UV absorber, a light stabilizer, a defoaming agent, a thickener, a rust inhibitor, a surface conditioner, and the like.

The clear coat paint (P3) can be applied by a method known per se, such as by air-less spraying, air spraying, and using a rotary atomizing coater, and electrostatic application may be implemented during coating.

The clear coat paint (P3) can be applied such that the film thickness thereof is typically in a range of from 10 to 80 μm, preferably from 15 to 60 μm, and more preferably from 20 to 50 m, based on the cured film thickness. Also, from perspectives such as preventing the occurrence of coating film defects, after the clear coat paint (P3) has been applied, as necessary, the clear coat paint (P3) may be left at room temperature for an approximate interval of from 1 to 60 minutes, or the clear coat paint (P3) may be preheated at a temperature of from approximately 40 to approximately 80° C. for around 1 to 60 minutes.

[(4) Multilayer Coating Film Curing Step]

In (4) multilayer coating film curing step, the multilayer coating film including the first coating film, the second coloring coating film, and the clear coat coating film formed in (1) first coating film forming step to (3) clear coat coating film forming step is heated to cure the multilayer coating film including these three coating films at one time.

When an object to be coated on which an uncured intermediate coating film is formed is used as the object to be coated, as described above, a multilayer coating film including the four layers of the intermediate coating film, the first coating film, the second coloring coating film, and the clear coat coating film can be cured at one time.

The heating can be implemented, for example, by a means such as hot air heating, infrared heating, and high frequency heating. The heating temperature is preferably from 60 to 160° C., more preferably from 80 to 150° C., and particularly preferably from 100 to 140° C. Furthermore, the heating time is preferably from 10 to 60 minutes, and more preferably from 15 to 40 minutes.

The multilayer coating film formed by the above steps has a stacked structure including three layers of a first coating film, a second coloring coating film, and a clear coat coating film formed on the object to be coated, or four layers of an intermediate coating film, a first coating film, a second coloring coating film, and a clear coat coating film formed on the object to be coated. The method of the present invention adopts a method of curing at one time a multilayer coating film including the three layers of a first coating film, a second coloring coating film, and a clear coat coating film, or a multilayer coating film including four layers of an intermediate coating film, a first coating film, a second coloring coating film, and a clear coat coating film. Using the first water-based paint (P1) and the second water-based coloring paint (P2) having specific compositions and properties to form the first coating film and the second coloring coating film having specific characteristics, film thicknesses, and the like makes it possible to form a multilayer coating film excellent in metallic unevenness resistance and brightness.

The multilayer coating film preferably has an L*25 value in a range of from 75 to 120, more preferably in a range of from 80 to 115, and still more preferably in a range of from 90 to 110.

In the present specification, the L*25 value is defined as an L* value calculated from the spectral reflectance of light received at 90 degrees in relation to the surface of the coating film when light irradiates the coating film at 25 degrees in relation to a vertical axis of the coating film, the spectral reflectance being obtained using the CM-512m3 multi-angle spectrophotometer (trade name, available from Konica Minolta, Inc.).

The L* value means an L* value in the L*a*b* color system.

In general, when the multilayer coating film has an L*25 value in a range of from 75 to 120, metallic unevenness tends to be conspicuous.

The method for forming a multilayer coating film of the present invention has an advantage that it is possible to form a multilayer coating film having excellent metallic unevenness resistance and brightness even when the multilayer coating film has an L*25 value in a range of from 75 to 120.

The reason for being able to form, through the present invention, a multilayer coating film having excellent metallic unevenness resistance and brightness is not necessarily obvious, but the following is presumed as one of the reasons. That is, it is presumed that using, as the first water-based paint (P1), a paint containing the compound (A) containing a hydroxyl group and an acid group, and having an acid value within a range of from 50 to 150 mg KOH/g, a hydroxyl value within a range of from 100 to 300 mg KOH/g, and a weight average molecular weight within a range of from 500 to 8000, the film-forming resin (B), and the crosslinking agent (C) makes it possible to improve the water retention of the first water-based paint (P1) and suppress an increase in viscosity due to volatilization of moisture in the first water-based paint (P1), which relatively maintains the flowability of the first coating film, and as a result, a first coating film excellent in smoothness is formed. Further, the second water-based coloring paint (P2) containing the effect pigment ($B_{P2}$) and having a relatively low paint solid content concentration ($NV_{P2}$) is applied onto the first coating film excellent in smoothness, and the effect pigment ($B_{P2}$) in the second water-based coloring paint (P2) is relatively uniformly and parallel aligned on the first coating film excellent in smoothness in the drying process, and thus it is presumed that the second coloring coating film excellent in metallic unevenness resistance and brightness is formed. It is presumed that, as a result, a multilayer coating film having excellent metallic unevenness resistance and brightness is formed.

EXAMPLES

The present invention will next be described in more detail with reference to Production Examples, Examples, and Comparative Examples. However, the present invention is not limited by these examples only. In each example, "parts" and "%" are based on mass unless otherwise specified. Also, the film thickness of the coating film is based on the cured film thickness.

Production of Intermediate Paint (PR)

Production Example 1

Production of Hydroxyl Group-Containing Polyester Resin

A reaction vessel equipped with a thermometer, a thermostat, a stirrer, a reflux condenser, and a water separator was charged with 174.0 parts of trimethylolpropane, 327.0 parts of neopentyl glycol, 352.0 parts of adipic acid, 109.0 parts of isophthalic acid, and 101.0 parts of 1,2-cyclohexane dicarboxylic anhydride, and the temperature was raised from 160° C. to 230° C. over 3 hours. Then, while the resulting condensed water was distilled off using the water separator, the temperature was maintained at 230° C., and the mixture was reacted until the acid value reached 3 mg KOH/g or less. To this reaction product, 59.0 parts of trimellitic anhydride were added, the mixture was subjected to an addition reaction at 170° C. for 30 minutes, after which the mixture was cooled to 50° C. or lower, and 2-(dimethylamino) ethanol was added in an amount equivalent to the acid groups to neutralize the mixture. Then, deionized water was gradually added to obtain a hydroxyl group-containing polyester resin (PE-1) solution having a solid content concentration of 45% and a pH of 7.2. The resulting hydroxyl group-containing polyester resin solution (PE-1) had an acid value of 35 mg KOH/g, a hydroxyl value of 128 mg KOH/g, and a weight average molecular weight of 13000.

Production Example 2

Production of Hydroxyl Group-Containing Acrylic Resin

A reaction vessel equipped with a thermometer, a thermostat, a stirring device, a reflux condenser, a nitrogen inlet tube, and a dripping device was charged with 35.0 parts of propylene glycol monopropyl ether, and the temperature was raised to 85° C. Subsequently, a mixture of 30.0 parts of methyl methacrylate, 20.0 parts of 2-ethylhexyl acrylate, 29.0 parts of n-butyl acrylate, 15.0 parts of 2-hydroxyethyl acrylate, 6.0 parts of acrylic acid, 15.0 parts of propylene glycol monopropyl ether, and 2.3 parts of 2,2'-azobis(2,4-dimethylvaleronitrile) was added dropwise over 4 hours, and after completion of the dropwise addition, the mixture was aged for 1 hour. A mixture of 10.0 parts of propylene glycol monopropyl ether and 1.0 part of 2,2'-azobis(2,4-dimethylvaleronitrile) was then further added dropwise over 1 hour, and after completion of the dropwise addition, the mixture was aged for 1 hour. Then, 7.4 parts of diethanolamine and 13.0 parts of propylene glycol monopropyl ether were added, and a hydroxyl group-containing acrylic resin (B-1), whereby a solution having a solid content concentration of 55% was obtained. The obtained hydroxyl group-containing acrylic resin (B-1) had an acid value of 47 mg KOH/g and a hydroxyl value of 72 mg KOH/g.

Production Example 3

Production of Titanium Dioxide Pigment Dispersion

The hydroxyl group-containing polyester resin (PE-1) solution obtained in Production Example 1 in an amount of 56.0 parts (25 parts in terms of resin solid content), 90.0 parts of "JR-806" (trade name, available from Tayca Co., Ltd., rutile titanium dioxide), and 5.0 parts of deionized water were put into a stirring and mixing vessel, 2-(dimethylamino)ethanol was further added, and the pH was adjusted to 8.0, whereby a mixed solution was obtained. The resulting mixed solution was then inserted into a wide-mouth glass bottle, glass beads with a diameter of about 1.3 mmφ were inserted as a dispersion media, and the wide-mouth glass bottle was sealed. The contents were dispersed with a paint shaker for 30 minutes, and a titanium dioxide pigment dispersion (X-1) was obtained.

Production Example 4

Production of Black Pigment Dispersion

The hydroxyl group-containing acrylic resin (B-1) solution obtained in Production Example 2 in an amount of 18.0 parts (10 parts in terms of resin solid content), 10.0 parts of "Carbon MA-100" (trade name, available from Mitsubishi Chemical Corporation, carbon black pigment), and 60.0 parts of deionized water were mixed, the pH was adjusted to 8.2 using 2-(dimethylamino)ethanol, after which the mixture was dispersed with a paint shaker for 30 minutes, whereby a black pigment dispersion (X-2) was obtained.

Production Example 5

Production of Extender Pigment Dispersion

The hydroxyl group-containing acrylic resin (B-1) solution obtained in Production Example 2 in an amount of 18.0 parts (10 parts in terms of resin solid content), 25.0 parts of "Barifine BF-20" (trade name, available from Sakai Chemical Industry Co., Ltd., barium sulfate pigment), 0.6 parts (0.3 parts in terms of solid content) of "Surfynol 104A" (trade name, available from Evonik Industries AG, defoaming agent, solid content concentration of 50%), and 36.0 parts of deionized water were mixed and dispersed with a paint shaker for one minute, whereby an extender pigment dispersion (X-3) was obtained.

Production Example 6

Production of Water-Based Intermediate Paint

The hydroxyl group-containing polyester resin (PE-1) solution obtained in Production Example 1 in an amount of 54.9 parts (24.7 parts in terms of resin solid content), 2.5 parts (1.4 parts in terms of resin solid content) of the hydroxyl group-containing acrylic resin (B-1) solution obtained in Production Example 2, 42.9 parts (15 parts in terms of resin solid content) of "Ucoat UX-8100" (trade name, available from Sanyo Chemical Industries, Ltd., urethane emulsion, solid content concentration of 35%), 37.5 parts (30 parts in terms of resin solid content) of "Cymel 325" (trade name, available from Allnex GmbH, melamine resin, solid content concentration of 80%), 26.3 parts (10 parts in terms of resin solid content) of "Bayhydur VP LS 2310" (trade name, available from Sumika Covestro Urethane Co., Ltd., blocked polyisocyanate compound, solid content concentration of 38%), 16.7 parts (10 parts of titanium dioxide pigment, 2.8 parts in solid content of the hydroxyl group-containing polyester resin (PE-1)) of the titanium dioxide pigment dispersion (X-1) obtained in Production Example 3, 15.0 parts (1.7 parts of carbon black pigment, 1.7 parts of solid content of the hydroxyl group-containing acrylic resin (B-1)) of the black pigment dispersion (X-2) obtained in Production Example 4, and 115.0 parts (36 parts of barium sulfate pigment, 14.4 parts of solid content of the hydroxyl group-containing acrylic resin (B-1)) of the extender pigment dispersion (X-3) obtained in Production Example 5 were homogeneously mixed, whereby a mixture was obtained. Next, "Primal ASE-60" (trade name, available from The Dow Chemical Company, acrylic thickener), 2-(dimethylamino)ethanol, and deionized water were added to the obtained mixture, and a water-based intermediate paint (PR-1) was obtained with a pH of 8.0, a paint solid content concentration (NV) of 48%, and a viscosity of 1300 mPa·sec as measured using a Brookfield viscometer (type B viscometer) under measurement conditions including a temperature of 20° C. and a rotational speed of 6 revolutions per minute (6 rpm). The "LVDV-I" (trade name, available from Brookfield Engineering Co., Ltd.) was used as the Brookfield viscometer (type B viscometer).

Production of First Water-Based Paint (P1)

Production Example 7

Production of Acrylic Resin (A1) Containing Hydroxyl Group and Acid Group

A reaction vessel equipped with a thermometer, a thermostat, a stirrer, a reflux condenser, a nitrogen inlet tube, and a dropping device was charged with 30.0 parts of 2-ethylhexanol and 5.0 parts of cyclohexanone, and the temperature was raised to 153° C. Thereafter, a mixture 1 of 41.0 parts of 2-hydroxyethyl methacrylate, 10.5 parts of methacrylic acid, 9.5 parts of 2-ethylhexyl acrylate, 34.0 parts of 2-ethylhexyl methacrylate, 5.0 parts of 2-ethylhexanol, and 7.5 parts of di-tertiary-amyl peroxide was dropped over 4 hours, and after completion of the dropping, the reaction solution was aged for 1 hour. Thereafter, the temperature of the reaction solution was adjusted to 120° C., then a mixture 2 of 2.0 parts of methacrylic acid, 3.0 parts of 2-ethylhexyl acrylate, 15.5 parts of 2-ethylhexanol, and 1.5 parts of perbutyl O (trade name: manufactured by NOF Corporation, polymerization initiator, tert-butylperoxy-2-ethylhexanoate) was added dropwise to the reaction solution over 0.5 hours, and after completion of the dropwise addition, the reaction solution was aged for 0.5 hours. A mixture 3 of 2.0 parts of 2-ethylhexanol and 0.5 parts of perbutyl O was added dropwise to the reaction solution over 0.5 hours, and after completion of the dropwise addition, the reaction solution was aged for 1 hour. The reaction solution was diluted with 2.5 parts of 2-ethylhexanol to obtain a hydroxyl group-containing acrylic resin (A1-1) solution having a solid content concentration of a 60%. The obtained hydroxyl group-containing acrylic resin (A1-1) had an acid value of 281 mg KOH/g, a hydroxyl value of 177 mg KOH/g, and a weight average molecular weight of 3000.

Production Examples 8 to 17

Solutions of macrylic resins (A1-2) to (A-11) containing a hydroxyl group and an acid group were obtained in the same manner as in Production Example 7 except that the compositions of the mixtures 1 to 3 were changed as shown in Table 1 below. The acid values, the hydroxyl values, and the weight average molecular weights of the obtained acrylic resins (A1-2) to (A1-11) containing a hydroxyl group and an acid group are also shown in Table 1 below. The acrylic resins (A1-9) to (A1-11) containing a hydroxyl group and an acid group obtained in Production Examples 15 to 17 are for comparative examples.

TABLE 1

| Production Examples | | 7 | 8 | 9 | 10 | 11 | 12 | 13 | 14 | 15 | 16 | 17 |
|---|---|---|---|---|---|---|---|---|---|---|---|---|
| Acrylic resin (A1) containing hydroxyl group and acid group | | A1-1 | A1-2 | A1-3 | A1-4 | A1-5 | A1-6 | A1-7 | A1-8 | A1-9 | A1-10 | A1-11 |
| Organic solvent | 2-Ethylhexanol | 30.0 | 30.0 | 30.0 | 30.0 | 30.0 | 30.0 | 30.0 | 30.0 | 30.0 | 30.0 | 30.0 |
| | Cyclohexanone | 5.0 | 5.0 | 5.0 | 5.0 | 5.0 | 5.0 | 5.0 | 5.0 | 5.0 | 5.0 | 5.0 |

TABLE 1-continued

| | Production Examples | | 7 | 8 | 9 | 10 | 11 | 12 | 13 | 14 | 15 | 16 | 17 |
|---|---|---|---|---|---|---|---|---|---|---|---|---|---|
| Mixture 1 | Hydroxyl group-containing polymerizable unsaturated monomer (a) | 2-Hydroxyethyl methacrylate | 41.0 | 41.0 | 41.0 | 41.0 | 23.2 | 69.6 | 41.0 | 41.0 | 41.0 | 18.6 | 41.0 |
| | Acid group-containing polymerizable unsaturated monomer (b) | Methacrylic acid | 10.5 | 5.7 | 14.9 | 21.0 | 10.5 | 10.5 | 10.5 | 10.5 | 2.6 | 10.5 | 10.5 |
| | Additional polymerizable unsaturated monomer (c) | 2-Ethylhexyl acrylate | 9.5 | 11.1 | 7.3 | 5.0 | 19.5 | 0.0 | 9.5 | 9.5 | 12.7 | 19.5 | 9.5 |
| | | 2-Ethylhexyl methacrylate | 34.0 | 37.2 | 31.8 | 28.0 | 41.8 | 14.9 | 34.0 | 34.0 | 38.7 | 46.4 | 34.0 |
| | Organic solvent | 2-Ethylhexanol | 5.0 | 5.0 | 5.0 | 5.0 | 5.0 | 5.0 | 5.0 | 5.0 | 5.0 | 5.0 | 5.0 |
| | Polymerization initiator | Di-tertiary-amyl peroxide | 7.5 | 7.5 | 7.5 | 7.5 | 7.5 | 7.5 | 10.0 | 3.0 | 7.5 | 7.5 | 2.0 |
| Mixture 2 | Additional polymerizable unsaturated monomer (c) | Methacrylic acid | 2.0 | 2.0 | 2.0 | 2.0 | 2.0 | 2.0 | 2.0 | 2.0 | 2.0 | 2.0 | 2.0 |
| | | 2-Ethylhexyl acrylate | 3.0 | 3.0 | 3.0 | 3.0 | 3.0 | 3.0 | 3.0 | 3.0 | 3.0 | 3.0 | 3.0 |
| | Organic solvent | 2-Ethylhexanol | 15.5 | 15.5 | 15.5 | 15.5 | 15.5 | 15.5 | 15.5 | 15.5 | 15.5 | 15.5 | 15.5 |
| | Polymerization initiator | PERBUTYL O | 1.5 | 1.5 | 1.5 | 1.5 | 1.5 | 1.5 | 1.5 | 1.5 | 1.5 | 1.5 | 1.5 |
| Mixture 3 | Organic solvent | 2-Ethylhexanol | 2.0 | 2.0 | 2.0 | 2.0 | 2.0 | 2.0 | 2.0 | 2.0 | 2.0 | 2.0 | 2.0 |
| | Polymerization initiator | PERBUTYL O | 0.5 | 0.5 | 0.5 | 0.5 | 0.5 | 0.5 | 0.5 | 0.5 | 0.5 | 0.5 | 0.5 |
| | Organic solvent | 2-Ethylhexanol | 2.5 | 2.5 | 2.5 | 2.5 | 2.5 | 2.5 | 2.5 | 2.5 | 2.5 | 2.5 | 2.5 |
| | Acid value (mg KOH/g) | | 81 | 50 | 110 | 150 | 81 | 81 | 81 | 81 | 30 | 81 | 81 |
| | Hydroxyl value (mg KOH/g) | | 177 | 177 | 177 | 177 | 100 | 300 | 177 | 177 | 177 | 80 | 177 |
| | Weight average molecular weight | | 3000 | 3000 | 3000 | 3000 | 3000 | 3000 | 1000 | 17000 | 3000 | 3000 | 10000 |

Production Example 18

Production of Water-Dispersible Hydroxyl Group-Containing Acrylic Resin

A reaction vessel equipped with a thermometer, a thermostat, a stirring device, a reflux condenser, a nitrogen gas inlet tube, and a dripping device was charged with 128.0 parts of deionized water and 3.0 parts of "ADEKA REASOAP SR-1025" (trade name, available from Adeka Corporation, an emulsifier, active ingredient 25%), the contents were mixed by stirring in a nitrogen stream, and the temperature was raised to 80° C.

Next, an amount of 1% of the total amount of a monomer emulsion for a core portion described below and 5.3 parts of a 6% ammonium persulfate aqueous solution were introduced into the reaction vessel, and the reaction vessel was maintained at 80° C. for 15 minutes. Subsequently, the remaining portion of the emulsion for the core portion was added dropwise over 3 hours into the reaction vessel maintained at the same temperature, and after completion of the dropwise addition, the mixture was aged for 1 hour. A monomer emulsion for a shell part described below was then added dropwise over 1 hour, and the mixture was aged for 1 hour, thereafter the mixture was cooled to 30° C. while 40.0 parts of a 5% 2-(dimethylamino)ethanol aqueous solution was gradually added to the reaction vessel. The mixture was discharged while being filtered with a 100-mesh nylon cloth, whereby an aqueous dispersion of a water-dispersible hydroxyl group-containing acrylic resin (B-2) having an average particle size of 95 nm and a solid content concentration of 30% was obtained. The obtained water-dispersible hydroxyl group-containing acrylic resin (B-2) had an acid value of 33 mg KOH/g and a hydroxyl value of 25 mg KOH/g. The water-dispersible hydroxyl group-containing acrylic resin (B-2) corresponds to the water-dispersible hydroxyl group-containing acrylic resin (B11') having a core/shell multilayer structure.

Monomer emulsion for core part: The monomer emulsion for the core part was obtained by mixing and stirring 40.0 parts of deionized water, 2.8 parts of "ADEKA REASOAP SR-1025", 2.1 parts of methylene bisacrylamide, 16.1 parts of methyl methacrylate, 28.0 parts of ethyl acrylate, 21.0 parts of n-butyl acrylate, and 2.8 parts of styrene.

Monomer emulsion for shell part: The monomer emulsion for the shell part was obtained by mixing and stirring 17.0 parts of deionized water, 1.2 parts of "ADEKA REASOAP SR-1025", 0.03 parts of ammonium persulfate, 5.1 parts of 2-hydroxyethyl acrylate, 9.0 parts of n-butyl acrylate, 5.1 parts of methacrylic acid, 3.0 parts of styrene, 6.0 parts of methyl methacrylate, 1.8 parts of ethyl acrylate.

Production Example 19

Production of Water-Dispersible Hydroxyl Group-Containing Acrylic Resin

A reaction vessel equipped with a thermometer, a thermostat, a stirring device, a reflux condenser, a nitrogen gas inlet tube, and a dripping device was charged with 128 parts of deionized water and 3 parts of "ADEKA REASOAP SR-1025" (trade name, available from Adeka Corporation, an emulsifier, active ingredient 25%), the contents were mixed by stirring in a nitrogen stream, and the temperature was raised to 80° C.

Next, an amount of 1% of the total amount of a monomer emulsion for a core portion described below and 5.3 parts of a 6% ammonium persulfate aqueous solution were introduced into the reaction vessel, and the reaction vessel was maintained at 80° C. for 15 minutes. Subsequently, the remaining portion of the emulsion for the core portion was added dropwise over 3 hours into the reaction vessel maintained at the same temperature, and after completion of the dropwise addition, the mixture was aged for 1 hour. A monomer emulsion for the shell part described below was then added dropwise over 1 hour, and the mixture was aged for 1 hour, thereafter the mixture was cooled to 30° C. while 40.0 parts of a 5% 2-(dimethylamino)ethanol aqueous solution was gradually added to the reaction vessel. The mixture was discharged while being filtered with a 100-mesh nylon cloth, whereby an aqueous dispersion of a water-dispersible hydroxyl group-containing acrylic resin (B-3) having an average particle size of 100 nm and a solid content concentration of 30% was obtained. The obtained water-dispersible hydroxyl group-containing acrylic resin (B-3) had an acid value of 22 mg KOH/g and a hydroxyl value of 9 mg KOH/g. The water-dispersible hydroxyl group-containing acrylic resin (B-3) corresponds to the water-dispersible hydroxyl group-containing acrylic resin (B11) having a core/shell multilayer structure.

Monomer emulsion for core part: The monomer emulsion for the core part was obtained by mixing and stirring 40.0 parts of deionized water, 2.8 parts of the "ADEKA REASOAP SR-1025", 2.0 parts of ethylene glycol dimethacrylate, 1.0 part of allyl methacrylate, 52.0 parts of methyl methacrylate, 12.0 parts of ethyl acrylate, and 10.0 parts of n-butyl acrylate.

Monomer emulsion for shell part: The monomer emulsion for the shell part was obtained by mixing and stirring 17.0 parts of deionized water, 1.2 parts of "ADEKA REASOAP SR-1025", 0.03 parts of ammonium persulfate, 2.0 parts of E2-hydroxyethyl methacrylate, 11.0 parts of n-butyl acrylate, 3.3 parts of methacrylic acid, 3.0 parts ofstyrene, 2.7 parts of methyl methacrylate, and 1.0 parts of methyl acrylate.

The content proportions of the polymerizable unsaturated monomer of the water-dispersible hydroxyl group-containing acrylic resins (B-2) and (B-3) are indicated in Table 2 below.

TABLE 2

| Production Examples | | | | 18 | 19 |
|---|---|---|---|---|---|
| Water-dispersible hydroxyl group-containing acrylic resin (B11) | | | | B-2 | B-3 |
| Deionized water | | | | 128.0 | 128.0 |
| ADEKA REASOAP SR-1025 | | | | 3.0 | 3.0 |
| 6% ammonium persulfate aqueous solution | | | | 5.3 | 5.3 |
| Monomer emulsion for core portion | Deionized water | | | 40.0 | 40.0 |
| | ADEKA REASOAP SR-1025 | | | 2.8 | 2.8 |
| | Polymerizable unsaturated monomer (b1-c) having at least two polymerizable unsaturated groups in one molecule | | Ethylene glycol dimethacrylate | | 2.0 |
| | | | Allyl methacrylate | | 1.0 |
| | | | Methylene bisacrylamide | 2.1 | |
| | Polymerizable unsaturated monomer (b1-d) having one polymerizable unsaturated group in one molecule | Polymerizable unsaturated monomer (b1-d1) having one polymerizable unsaturated group in one molecule and having an alkyl group having 1 or 2 carbons | Methyl methacrylate | 16.1 | 52.0 |
| | | | Ethyl acrylate | 28.0 | 12.0 |
| | | | n-butyl acrylate | 21.0 | 10.0 |
| | | | Styrene | 2.8 | |
| Monomer emulsion for shell portion | Deionized water | | | 17.0 | 17.0 |
| | ADEKA REASOAP SR-1025 | | | 1.2 | 1.2 |
| | Ammonium persulfate | | | 0.03 | 0.03 |
| | Hydroxyl group-containing polymerizable unsaturated monomer (b1-a) | | 2-hydroxyethyl methacrylate | | 2.0 |
| | | | 2-hydroxyethyl acrylate | 5.1 | |
| | Polymerizable unsaturated monomer (b1-e) | Polymerizable unsaturated monomer (b1-e1) having a hydrocarbon group having from 4 to 22 carbons | n-butyl acrylate | 9.0 | 11.0 |
| | | Carboxyl group-containing polymerizable unsaturated monomer (b1-e2) | Methacrylic acid | 5.1 | 3.3 |
| | | | Styrene | 3.0 | 3.0 |
| | | | Methyl methacrylate | 6.0 | 2.7 |
| | | | Ethyl acrylate | 1.8 | 1.0 |
| Average particle size [nm] | | | | 95.0 | 100.0 |
| Solid content concentration [mass %] | | | | 30.0 | 30.0 |
| Acid value [mg KOH/g] | | | | 33 | 22 |
| Hydroxyl value [mg KOH/g] | | | | 25 | 9 |
| Content proportion of monomer for core part based on total mass of monomer (b1-c) and monomer (b1-d) [mass %] | Polymerizable unsaturated monomer (b1-c) having at least two polymerizable unsaturated groups in one molecule | | | 3.0 | 3.9 |
| | Polymerizable unsaturated monomer (b1-d) having one polymerizable unsaturated group in one molecule | | | 97.0 | 96.1 |
| | Polymerizable unsaturated monomer (b1-d1) having one polymerizable unsaturated group in one molecule and having an alkyl group having 1 or 2 carbons | | | 63.0 | 83.1 |
| Content proportion of monomer for each shell part based on total mass of monomers (b1-a) and (b1-e) [mass %] | Hydroxyl group-containing polymerizable unsaturated monomer (b1-a) | | | 17.0 | 8.7 |
| | Polymerizable unsaturated monomer (b1-e) | | | 83.0 | 91.3 |
| | Polymerizable unsaturated monomer (b1-e1) having a hydrocarbon group having from 4 to 22 carbons | | | 30.0 | 47.8 |
| | Carboxyl group-containing polymerizable unsaturated monomer (b1-e2) | | | 17.0 | 14.3 |

Production Example 20

Production of Acrylic Resin Having Hydroxyl Group and Phosphate Group

A reaction vessel equipped with a thermometer, a thermostat, a stirrer, a reflux condenser, a nitrogen gas introduction tube, and a dripping device was charged with a mixed solvent of 27.5 parts of methoxypropanol and 27.5 parts of isobutanol and heated to 110° C. To the mixed solvent, 121.5 parts of a mixture of 25.0 parts of styrene, 27.5 parts of n-butyl methacrylate, 20.0 parts of "Isostearyl Acrylate" (trade name, available from Osaka Organic Chemical Ind. Ltd., branched higher alkyl acrylate), 7.5 parts of 4-hydroxybutyl acrylate, 15.0 parts of a phosphate group-containing polymerizable monomer described below, 12.5 parts of 2-methacryloyloxyethyl acid phosphate, 10.0 parts of isobutanol, and 4.0 parts of tert-butyl peroxyoctanoate was added over 4 hours. A mixture of 0.5 parts of tert-butyl peroxyoctanoate and 20.0 parts of isopropanol was then further added dropwise over one hour. Thereafter, the resulting mixture was stirred and aged for one hour, and a solution of an acrylic resin (B-4) having a hydroxyl group and a phosphate group, which had a solid content concentration of 50%, was obtained. The acid value due to the phosphate group of the acrylic resin (B-4) having a hydroxyl group and a phosphate group was 83 mg KOH/g, the hydroxyl value was 29 mg KOH/g, and the weight average molecular weight was 10000.

Phosphate group-containing polymerizable monomer: A reaction vessel equipped with a thermometer, a thermostat, a stirrer, a reflux condenser, a nitrogen gas inlet tube, and a dripping device was charged with 57.5 parts of monobutyl phosphate and 41.0 parts of isobutanol and heated to 90° C., after which 42.5 parts of glycidyl methacrylate were added dropwise over 2 hours, and the mixture was further stirred and aged for 1 hour. Subsequently, 59.0 parts of isopropanol was added, to obtain a phosphate group-containing polymerizable monomer solution having a solid content concentration of 50%. The acid value of the resulting monomer was 285 mg KOH/g.

Production Example 21

Production of Hydroxyl Group-Containing Polyester Resin

A reaction vessel equipped with a thermometer, a thermostat, a stirring device, a reflux condenser, a nitrogen gas inlet tube, and a water separator was charged with 109.0 parts of trimethylolpropane, 141.0 parts of 1,6-hexanediol, 126.0 parts of 1,2-cyclohexane dicarboxylic anhydride, and 120.0 parts of adipic acid. The temperature was raised from 160° C. to 230° C. over 3 hours, and then a condensation reaction was performed at 230° C. for 4 hours. Next, to introduce carboxyl groups into the resulting condensation reaction product, 38.3 parts of trimellitic anhydride were added and reacted at 170° C. for 30 minutes, after which the mixture was diluted with 2-ethyl-1-hexanol, whereby a hydroxyl group-containing polyester resin (PE-2) solution having a solid content concentration of 70% was obtained. The obtained hydroxyl group-containing polyester resin solution (PE-2) had an acid value of 46 mg KOH/g, a hydroxyl value of 150 mg KOH/g, and a number-average molecular weight of 1400. In the raw material composition, the total content of the alicyclic polybasic acid in the acid component was 46 mol % based on the total amount of the acid component.

Production Example 22

Production of Yellow Pigment Dispersion

The hydroxyl group-containing acrylic resin (B-1) solution obtained in Production Example 2 in an amount of 18.0 parts (10 parts in terms of resin solid content), 10.0 parts of "Daipyroxide™ Yellow 8170" (trade name, available from Dainichiseika Color & Chem MFG Co., Ltd., yellow iron oxide pigment), and 60.0 parts of deionized water were mixed, the pH was adjusted to 8.2 using 2-(dimethylamino) ethanol, after which the mixture was dispersed with a paint shaker for 30 minutes, whereby a yellow pigment dispersion (X-4) was obtained.

Production Example 23

Production of Black Pigment Dispersion

The hydroxyl group-containing acrylic resin (B-1) solution obtained in Production Example 2 in an amount of 25.0 parts (resin solid content 14 parts), 7.0 parts of "Raven 5000 Ultra III Beads" (trade name, available from Birla Carbon, carbon black pigment), and 68.0 parts of deionized water were mixed, the pH was adjusted to 7.5 using 2-(dimethylamino)ethanol, after which the mixture was dispersed with a paint shaker for 30 minutes, whereby a black pigment dispersion (X-5) was obtained.

Production Example 24

Production of First Water-Based Paint (P1)

In a stirring and mixing vessel, 5.5 parts (solid content 4.2 parts) of "Aluminum Paste GX-3108" (trade name, available from Asahi Kasei Metals Corporation, an aluminum pigment paste, aluminum content of 77%), 2.4 parts (solid content 1.8 parts) of "Aluminum Paste GX-3100" (trade name, available from Asahi Kasei Metals Corporation, an aluminum pigment paste, aluminum content of 74%), 35.0 parts of 2-ethyl-1-hexanol, 3.6 parts (solid content 1.8 parts) of the solution of the acrylic resin (B-4) having a hydroxyl group and a phosphate group obtained in Production Example 20, and 0.2 parts of 2-(dimethylamino) ethanol were homogeneously mixed, whereby an effect pigment dispersion was obtained.

Next, 46.7 parts of the obtained effect pigment dispersion, 100 parts (solid content 30 parts) of the water-based dispersion of the water-dispersible hydroxyl group-containing acrylic resin (B-2) obtained in Production Example 18, 3.1 parts (solid content 1.7 parts) of the hydroxyl group-containing acrylic resin (B-1) solution obtained in Production Example 2, 21.4 parts (solid content 15 parts) of the hydroxyl group-containing polyester resin (PE-2) solution obtained in Production Example 21, 28.6 parts (solid content 10 parts) of "UCOAT UX-8100 " (trade name, polyurethane resin emulsion manufactured by Sanyo Chemical Industries, Ltd., solid content 35%), 37.5 parts (solid content 30 parts) of "CYMEL 325" (trade name, melamine resin manufactured by Allnex Ltd., solid content 80%), 3.0 parts (0.5 parts of yellow iron oxide pigment, 0.5 parts of hydroxyl group-containing acrylic resin (B-1) solid content) of the yellow pigment dispersion (X-4) obtained in Production Example 22, and 63.8 parts of the extender pigment dispersion (X-3) (barium sulfate pigment: 20 parts, hydroxyl group-containing acrylic resin (B-1): solid content 8 parts) obtained in Production Example 5 were added and mixed uniformly, and further, “Primal ASE-60” (trade name: polyacrylic acid-based thickener, manufactured by The Dow Chemical Company, solid content 28%), 2-(dimethylamino)ethanol and deionized water were added thereto, whereby a first water-based paint (P1-1) of pH 7.7 having a viscosity of 4000 mPa·sec as measured with a B-type viscometer at a temperature of 23° C. after 1 minute at 6 rpm and a paint solid content concentration ($NV_{P1}$) of 30% was obtained.

Production Examples 25 to 37, 39, and 41 to 52

First water-based paints (P1-2) to (P1-14), (P1-16), (P1-18) to (P1-29) of pH 7.7 having a viscosity of 4000 mPa·sec as measured with a B-type viscometer at a temperature of 23° C. after 1 minute at 6 rpm was obtained in the same manner as in Production Example 24 except that the formulation and the paint solid content concentration ($NV_{P1}$) in Production Example 24 were changed as listed in the following Tables 3 to 6.

Production Examples 38 and 40

Production of Second Water-Based Coloring Paint (P2)

First water-based paints (P1-15) and (P1-17) of pH 7.7 having a viscosity of 4000 mPa·sec as measured with a B-type viscometer at a temperature of 23° C. after 1 minute at 6 rpm were obtained in the same manner as in Production Example 24, except that the formulation and the paint solid content concentration ($NV_{P1}$) were changed as listed in Table 5 below, and a thickener mixture obtained by mixing “Primal ASE-60” and “ADEKA NOL UH-756VF” (trade name, urethane associative thickener, manufactured by ADEKA CORPORATION, solid content 32%) at a solid content mass ratio of 1/1 was used instead of “Primal ASE-60” in Production Example 24.

TABLE 3

| Production Examples | | | | 24 | 25 | 26 | 27 | 28 | 29 | 30 |
|---|---|---|---|---|---|---|---|---|---|---|
| First water-based paint (P-1) | | | | P1-1 | P1-2 | P1-3 | P1-4 | P1-5 | P1-6 | P1-7 |
| Effect pigment dispersion | Effect pigment | | Aluminum paste GX-3108 | 4.2 | 4.2 | 4.2 | 4.2 | 4.2 | 4.2 | 4.2 |
| | | | Aluminum paste GX-3110 | 1.8 | 1.8 | 1.8 | 1.8 | 1.8 | 1.8 | 1.8 |
| | Film-forming resin (B) | Hydroxyl group-containing acrylic resin (B1) | Acrylic resin containing hydroxyl group and phosphate group (B-4) | 1.8 | 1.8 | 1.8 | 1.8 | 1.8 | 1.8 | 1.8 |
| | Organic solvent | | 2-Ethyl-1-hexanol | 35.0 | 35.0 | 35.0 | 35.0 | 35.0 | 35.0 | 35.0 |
| Film-forming resin (B) | | Hydroxyl group-containing acrylic resin (B1) | Water-dispersible hydroxyl group-containing acrylic resin (B-2) | 30.0 | 30.0 | 30.0 | 30.0 | 30.0 | 30.0 | 30.0 |
| | | | Water-dispersible hydroxyl group-containing acrylic resin (B-3) | | | | | | | |
| | | | Hydroxyl group-containing acrylic resin (B-1) | 1.7 | 1.7 | 1.7 | 1.7 | 1.7 | 1.7 | 1.7 |
| | | Hydroxyl group-containing polyester resin (B2) | Hydroxyl group-containing polyester resin (PE-2) | 15.0 | 15.0 | 15.0 | 15.0 | 15.0 | 15.0 | 15.0 |
| | | Polyurethane resin | UCOAT UX-8100 | 10.0 | 10.0 | 10.0 | 10.0 | 10.0 | 10.0 | 10.0 |
| Crosslinking agent (C) | | Melamine resin (C1) | CYMEL 325 | 30.0 | 30.0 | 30.0 | 30.0 | 30.0 | 30.0 | 30.0 |
| Compound containing hydroxyl group and acid group (A) | | Acrylic resin (A1) containing hydroxyl group and acid group | Type | A1-1 | A1-2 | A1-3 | A1-4 | A1-5 | A1-6 | A1-7 |
| | | | Amount | 3.0 | 3.0 | 3.0 | 3.0 | 3.0 | 3.0 | 3.0 |
| Extender pigment dispersion (X-3) | Extender pigment | | Barifine BF-20 | 20.0 | 20.0 | 20.0 | 20.0 | 20.0 | 20.0 | 20.0 |
| | Film-forming resin (B) | Hydroxyl group-containing acrylic resin (B1) | Hydroxyl group-containing acrylic resin (B-1) | 8.0 | 8.0 | 8.0 | 8.0 | 8.0 | 8.0 | 8.0 |
| Yellow pigment dispersion (X-4) | Color pigment | | DAIPYROXIDE TM Yellow 8170 | 0.5 | 0.5 | 0.5 | 0.5 | 0.5 | 0.5 | 0.5 |
| | Film-forming resin (B) | Hydroxyl group-containing acrylic resin (B1) | Hydroxyl group-containing acrylic resin (B-1) | 0.5 | 0.5 | 0.5 | 0.5 | 0.5 | 0.5 | 0.5 |
| Paint solid content concentration ($NV_{P1}$) [%] | | | | 30.0 | 30.0 | 30.0 | 30.0 | 30.0 | 30.0 | 30.0 |

TABLE 4

| Production Examples | | | | 31 | 32 | 33 | 34 | 35 | 36 | 37 |
|---|---|---|---|---|---|---|---|---|---|---|
| First water-based paint (P-1) | | | | P1-8 | P1-9 | P1-10 | P1-11 | P1-12 | P1-13 | P1-14 |
| Effect pigment dispersion | Effect pigment | | Aluminum paste GX-3108 | 4.2 | 4.2 | 4.2 | 4.2 | 4.2 | 4.2 | 4.2 |
| | | | Aluminum paste GX-3110 | 1.8 | 1.8 | 1.8 | 1.8 | 1.8 | 1.8 | 1.8 |
| | Film-forming resin (B) | Hydroxyl group-containing acrylic resin (B1) | Acrylic resin containing hydroxyl group and phosphate group (B-4) | 1.8 | 1.8 | 1.8 | 1.8 | 1.8 | 1.8 | 1.8 |

TABLE 4-continued

| Production Examples | | | | 31 | 32 | 33 | 34 | 35 | 36 | 37 |
|---|---|---|---|---|---|---|---|---|---|---|
| | | Organic solvent | 2-Ethyl-1-hexanol | 35.0 | 35.0 | 35.0 | 35.0 | 35.0 | 35.0 | 35.0 |
| Film-forming resin (B) | | Hydroxyl group-containing acrylic resin (B1) | Water-dispersible hydroxyl group-containing acrylic resin (B-2) | 30.0 | 31.0 | 28.0 | 26.0 | | 30.0 | 30.0 |
| | | | Water-dispersible hydroxyl group-containing acrylic resin (B-3) | | | | | 30.0 | | |
| | | | Hydroxyl group-containing acrylic resin (B-1) | 1.7 | 1.7 | 1.7 | 1.7 | 1.7 | 1.7 | 1.7 |
| | | Hydroxyl group-containing polyester resin (B2) | Hydroxyl group-containing polyester resin (PE-2) | 15.0 | 15.0 | 15.0 | 15.0 | 15.0 | 15.0 | 15.0 |
| | | Polyurethane resin | UCOAT UX-8100 | 10.0 | 10.0 | 10.0 | 10.0 | 10.0 | 10.0 | 10.0 |
| Crosslinking agent (C) | | Melamine resin (C1) | CYMEL 325 | 30.0 | 30.0 | 30.0 | 30.0 | 30.0 | 30.0 | 30.0 |
| Compound containing hydroxyl group and acid group (A) | | Acrylic resin (A1) hydroxyl group and containing acid group | Type | A1-8 | A1-1 | A1-1 | A1-1 | A1-1 | A1-1 | A1-1 |
| | | | Amount | 3.0 | 2.0 | 5.0 | 7.0 | 3.0 | 3.0 | 3.0 |
| Extender pigment dispersion (X-3) | | Extender pigment | Barifine BF-20 | 20.0 | 20.0 | 20.0 | 20.0 | 20.0 | 20.0 | 20.0 |
| | Film-forming resin (B) | Hydroxyl group-containing acrylic resin (B1) | Hydroxyl group-containing acrylic resin (B-1) | 8.0 | 8.0 | 8.0 | 8.0 | 8.0 | 8.0 | 8.0 |
| Yellow pigment dispersion (X-4) | | Color pigment | DAIPYROXIDE TM Yellow 8170 | 0.5 | 0.5 | 0.5 | 0.5 | 0.5 | 0.5 | 0.5 |
| | Film-forming resin (B) | Hydroxyl group-containing acrylic resin (B1) | Hydroxyl group-containing acrylic resin (B-1) | 0.5 | 0.5 | 0.5 | 0.5 | 0.5 | 0.5 | 0.5 |
| Paint solid content concentration ($NV_{P1}$) [%] | | | | 30.0 | 30.0 | 30.0 | 30.0 | 30.0 | 28.0 | 32.0 |

TABLE 5

| Production Examples | | | | 38 | 39 | 40 | 41 | 42 | 43 | 44 |
|---|---|---|---|---|---|---|---|---|---|---|
| First water-based paint (P-1) | | | | P1-15 | P1-16 | P1-17 | P1-18 | P1-19 | P1-20 | P1-21 |
| Effect pigment dispersion | | Effect pigment | Aluminum paste GX-3108 | 4.2 | 4.2 | 4.2 | 4.2 | 4.2 | 4.2 | 4.2 |
| | | | Aluminum paste GX-3110 | 1.8 | 1.8 | 1.8 | 1.8 | 1.8 | 1.8 | 1.8 |
| | Film-forming resin (B) | Hydroxyl group-containing acrylic resin (B1) | Acrylic resin containing hydroxyl group and phosphate group (B-4) | 1.8 | 1.8 | 1.8 | 1.8 | 1.8 | 1.8 | 1.8 |
| | | Organic solvent | 2-Ethyl-1-hexanol | 35.0 | 35.0 | 35.0 | 35.0 | 35.0 | 35.0 | 35.0 |
| Film-forming resin (B) | | Hydroxyl group-containing acrylic resin (B1) | Water-dispersible hydroxyl group-containing acrylic resin (B-2) | 30.0 | 30.0 | | 33.0 | 30.0 | 30.0 | 30.0 |
| | | | Water-dispersible hydroxyl group-containing acrylic resin (B-3) | | | 30.0 | | | | |
| | | | Hydroxyl group-containing acrylic resin (B-1) | 1.7 | 1.7 | 1.7 | 1.7 | 1.7 | 1.7 | 1.7 |
| | | Hydroxyl group-containing polyester resin (B2) | Hydroxyl group-containing polyester resin (PE-2) | 15.0 | 15.0 | 15.0 | 15.0 | 15.0 | 15.0 | 15.0 |
| | | Polyurethane resin | UCOAT UX-8100 | 10.0 | 10.0 | 10.0 | 10.0 | 10.0 | 10.0 | 10.0 |
| Crosslinking agent (C) | | Melamine resin (C1) | CYMEL 325 | 30.0 | 30.0 | 30.0 | 30.0 | 30.0 | 30.0 | 30.0 |
| Compound containing hydroxyl group and acid group (A) | | Acrylic resin (A1) containing hydroxyl group and acid group | Type | A1-1 | A1-1 | A1-1 | | A1-11 | A1-12 | A1-13 |
| | | | Amount | 3.0 | 3.0 | 3.0 | | 3.0 | 3.0 | 3.0 |
| Extender pigment dispersion (X-3) | | Extender pigment | Barifine BF-20 | 20.0 | 20.0 | 20.0 | 20.0 | 20.0 | 20.0 | 20.0 |
| | Film-forming resin (B) | Hydroxyl group-containing acrylic resin (B1) | Hydroxyl group-containing acrylic resin (B-1) | 8.0 | 8.0 | 8.0 | 8.0 | 8.0 | 8.0 | 8.0 |
| Yellow pigment dispersion (X-4) | | Color pigment | DAIPYROXIDE TM Yellow 8170 | 0.5 | 0.5 | 0.5 | 0.5 | 0.5 | 0.5 | 0.5 |
| | Film-forming resin (B) | Hydroxyl group-containing acrylic resin (B1) | Hydroxyl group-containing acrylic resin (B-1) | 0.5 | 0.5 | 0.5 | 0.5 | 0.5 | 0.5 | 0.5 |
| Paint solid content concentration ($NV_{P1}$) [%] | | | | 30.0 | 25.0 | 25.0 | 30.0 | 30.0 | 30.0 | 30.0 |

TABLE 6

| Production Examples | | | | 45 | 46 | 47 | 48 | 49 | 50 | 51 | 52 |
|---|---|---|---|---|---|---|---|---|---|---|---|
| First water-based paint (P-1) | | | | P1-22 | P1-23 | P1-24 | P1-25 | P1-26 | P1-27 | P1-28 | P1-29 |
| Film-forming resin (B) | | Hydroxyl group-containing acrylic resin (B1) | Water-dispersible hydroxyl group-containing acrylic resin (B-2) | 30.0 | 45.0 | 35.0 | 30.0 | 30.0 | 30.0 | 30.0 | 33.0 |
| | | | Water-dispersible hydroxyl group-containing acrylic resin (B-3) | | | | | | | | |
| | | | Hydroxyl group-containing acrylic resin (B-1) | 5.8 | 5.8 | 5.8 | 5.8 | 5.8 | 6.0 | 7.8 | 5.8 |
| | | Hydroxyl group-containing polyester resin (B2) | Hydroxyl group-containing polyester resin (PE-2) | 15.0 | | 20.0 | 15.0 | 15.0 | 15.0 | 15.0 | 15.0 |
| | | Polyurethane resin | UCOAT UX-8100 | 10.0 | 10.0 | | 10.0 | 10.0 | 10.0 | 10.0 | 10.0 |
| Crosslinking agent (C) | | Melamine resin (C1) | CYMEL 325 | 34.0 | 34.0 | 34.0 | 34.0 | 34.0 | 34.0 | 34.0 | 34.0 |
| Compound containing hydroxyl group and acid group (A) | | Acrylic resin (A1) containing hydroxyl group and acid group | Type | A1-1 | A1-1 | A1-1 | A1-1 | A1-1 | A1-1 | A1-1 | |
| | | | Amount | 3.0 | 3.0 | 3.0 | 3.0 | 3.0 | 3.0 | 3.0 | |
| Organic solvent | | | 2-Ethyl-1-hexanol | 35.0 | 35.0 | 35.0 | 35.0 | 35.0 | 35.0 | 35.0 | 35.0 |
| Extender pigment dispersion (X-3) | Extender pigment | | Barifine BF-20 | 5.0 | 5.0 | 5.0 | 5.0 | 5.0 | 5.0 | | 5.0 |
| | Film-forming resin (B) | Hydroxyl group-containing acrylic resin (B1) | Hydroxyl group-containing acrylic resin (B-1) | 2.0 | 2.0 | 2.0 | 2.0 | 2.0 | 2.0 | | 2.0 |
| Yellow pigment dispersion (X-4) | Color pigment | | RAVEN 5000 ULTRA III BEADS | 0.1 | 0.1 | 0.1 | 0.1 | 0.1 | | 0.1 | 0.1 |
| | Film-forming resin (B) | Hydroxyl group-containing acrylic resin (B1) | Hydroxyl group-containing acrylic resin (B-1) | 0.2 | 0.2 | 0.2 | 0.2 | 0.2 | | 0.2 | 0.2 |
| Paint solid content concentration ($NV_{P1}$) [%] | | | | 30.0 | 30.0 | 30.0 | 28.0 | 32.0 | 30.0 | 30.0 | 30.0 |

Production of Second Water-Based Coloring Paint (P2)

Production Example 53: Production of Second Water-Based Coloring Paint (P2)

In a stirring and mixing vessel, 34.3 parts (solid content 26.4 parts) of "Aluminum Paste GX-3108" (trade name, available from Asahi Kasei Metals Corporation, an aluminum pigment paste, aluminum content of 77%), 15.1 parts (solid content 10.6 parts) of "ALPASTE 6360NS" (trade name, available from Toyo Aluminum K.K., an aluminum pigment paste, aluminum content of 70%), 35 parts of 2-ethyl-1-hexanol, 22.2 parts (solid content 11.1 parts) of the solution of the acrylic resin (B-4) having a hydroxyl group and a phosphate group obtained in Production Example 20, and 0.2 parts of 2-(dimethylamino)ethanol were homogeneously mixed, whereby an effect pigment dispersion was obtained.

Next, 106.8 parts of the obtained effect pigment dispersion, 100 parts (solid content 30 parts) of the aqueous dispersion of the water-dispersible hydroxyl group-containing acrylic resin (B-2) obtained in Production Example 18, 19.8 parts (solid content 10.9 parts) of the hydroxyl group-containing acrylic resin (B-1 solution) obtained in Production Example 2, 21.4 parts (solid content 15 parts) of the hydroxyl group-containing polyester resin (PE-2) solution obtained in Production Example 21, 37.5 parts (solid content 30 parts) of "CYMEL 325" (trade name, melamine resin manufactured by Allnex Ltd., solid content 80%), 26.5 parts (3 parts of yellow iron oxide pigment, 3 parts of hydroxyl group-containing acrylic resin (B-1) solid content) of the yellow pigment dispersion (X-4) obtained in Production Example 22, and further, "Primal ASE-60" (trade name: polyacrylic acid-based thickener, manufactured by The Dow Chemical Company, solid content 28%), 2-(dimethylamino) ethanol and deionized water were added thereto, whereby a second water-based coloring paint (P2-1) of pH 7.8 having a viscosity of 4900 mPa·sec as measured with a B-type viscometer at a temperature of 23° C. after 1 minute at 6 rpm and a paint solid content concentration ($NV_{P2}$) of 14% was obtained.

Production Examples 54 to 59: Production of Second Water-Based Coloring Paint (P2)

Second water-based coloring paints (P2-2) to (P2-7) of pH 7.8 having a viscosity of 4900 mPa·sec as measured with a B-type viscometer at a temperature of 23° C. after 1 minute at 6 rpm were obtained in the same manner as in Production Example 53 except that the formulation and the paint solid content concentration ($NV_{P2}$) in Production Example 53 were changed as listed in the following Table 7.

TABLE 7

| Production Examples | | | 53 | 54 | 55 | 56 | 57 | 58 | 59 |
|---|---|---|---|---|---|---|---|---|---|
| Second water-based coloring paint (P2) | | | P2-1 | P2-2 | P2-3 | P2-4 | P2-5 | P2-6 | P2-7 |
| Effect pigment dispersion | Effect pigment ($B_{P2}$) | Aluminum paste GX-3108 | 26.4 | 26.4 | 26.4 | 26.4 | 26.4 | 26.4 | |
| | | ALPASTE 6360NS | 10.6 | 10.6 | 10.6 | 10.6 | 10.6 | 10.6 | 15.0 |
| | | Aluminum paste GX180A | | | | | | | 13.0 |
| | Binder component ($A_{P2}$) | Acrylic resin containing hydroxyl group and phosphate group (B-4) | 11.1 | 11.1 | 11.1 | 11.1 | 11.1 | 11.1 | 8.4 |
| | Organic solvent | 2-Ethyl-1-hexanol | 35.0 | 35.0 | 35.0 | 35.0 | 35.0 | 35.0 | 35.0 |
| Binder component ($A_{P2}$) | | Water-dispersible hydroxyl group-containing acrylic resin (B-2) | 30.0 | 30.0 | 30.0 | 30.0 | 30.0 | 30.0 | 27.0 |
| | | Hydroxyl group-containing acrylic resin (B-1) | 10.9 | 10.9 | 10.9 | 10.9 | 10.9 | 10.9 | 7.3 |
| | | Hydroxyl group-containing polyester resin (PE-2) | 15.0 | 15.0 | 15.0 | 15.0 | 15.0 | 15.0 | 20.0 |
| Crosslinking agent (C) | | CYMEL 325 | 30.0 | 30.0 | 30.0 | 30.0 | 30.0 | 30.0 | 33.0 |
| Yellow pigment dispersion (X-4) | Color pigment | "DAIPYROXIDE TM Yellow 8170" | 3.0 | 3.0 | 3.0 | 3.0 | 3.0 | 3.0 | |
| | Binder component ($A_{P2}$) | Hydroxyl group-containing acrylic resin (B-1) solution | 3.0 | 3.0 | 3.0 | 3.0 | 3.0 | 3.0 | |
| Black pigment dispersion (X-5) | Color pigment | RAVEN 5000 ULTRA III BEADS | | | | | | | 4.3 |
| | Binder component ($A_{P2}$) | Hydroxyl group-containing acrylic resin (B-1) | | | | | | | 4.3 |
| Paint solid content concentration ($NV_{P2}$) | | | 14.0 | 7.0 | 9.0 | 12.0 | 16.0 | 21.0 | 14.0 |
| Total solid content of binder component ($A_{P2}$) [parts by mass] | | | 100.0 | 100.0 | 100.0 | 100.0 | 100.0 | 100.0 | 100.0 |
| Paint solid content in second water-based coloring paint (P2) [parts by mass] | | | 140.0 | 140.0 | 140.0 | 140.0 | 140.0 | 140.0 | 132.3 |
| Total solid content of effect pigment ($B_{P2}$) [parts by mass] | | | 37.0 | 37.0 | 37.0 | 37.0 | 37.0 | 37.0 | 28.0 |
| Content proportion of effect pigment ($B_{P2}$) based on 100 parts by mass of solid content of binder component ($A_{P2}$) [parts by mass] | | | 37.0 | 37.0 | 37.0 | 37.0 | 37.0 | 37.0 | 28.0 |
| Content proportion of effect pigment ($B_{P2}$) based on paint solid content in second water-based coloring paint (P2) [mass %] | | | 26.4 | 26.4 | 26.4 | 26.4 | 26.4 | 26.4 | 21.2 |

Production of Second Water-Based Coloring Paint (P2)

Production Example 60: Production of Effect Pigment Dispersion

In a stirring and mixing vessel, 720 parts (solid content 72 parts) of "Hydroshine WS-3001" (trade name, vapor-deposited aluminum flake pigment for water-based use, available from Eckart GmbH, solid content concentration 10%, internal solvent: isopropanol, average particle size D50: 13 μm, thickness: 0.05 μm, silica-treated surface), 46.8 parts (solid content 22 parts) of "Alpaste EMR-B6360" (trade name, available from Toyo Aluminum K.K., solid content: 47%, non-leafing aluminum flakes, average particle size D50: 10.3 μm, thickness: 0.19 μm, silica-treated surface), 500 parts of isopropanol, and 500 parts of deionized water were stirred and mixed, whereby an effect pigment dispersion was obtained.

Production Example 61: Production of Second Water-Based Coloring Paint (P2)

In a stirring and mixing vessel, 2400.0 parts of deionized water, 1500.0 parts (solid content 30 parts) of "Aurovisco" (trade name, thickener, manufactured by Oji Paper Co., Ltd., phosphate esterified cellulose nanofiber, solid content concentration: 2%), 15.0 parts of "Dynol 604" (trade name, acetylene diol wetting agent, manufactured by Evonik Industries AG, solid content concentration: 100%), 1766.8 parts of the effect pigment dispersion obtained in Production Example 60, 28.7 parts (2.0 parts of carbon black pigment, 4.0 parts of hydroxyl group-containing acrylic resin (B-1) solid content) of the black pigment dispersion (X-5) obtained in Production Example 23, 8.4 parts (solid content: 8 parts) of "TINUVIN 384" (trade name, ultraviolet absorber, manufactured by BASF, solid content: 95%), 7.0 parts of "TINUVIN 292" (trade name, light stabilizer, manufactured by BASF, solid content concentration: 100%), 133.3 parts (solid content: 40 parts) of the water-dispersible hydroxyl group-containing acrylic resin (B-2) aqueous dispersion obtained in Production Example 18, 30.0 parts of 2-ethyl-1-hexanol, and 300.0 parts of deionized water were stirred and mixed to adjust a second water-based coloring paint (P2-8) having a paint solid content concentration ($NV_{P2}$) of 3.2%.

Production Example 62: Production of Second Water-Based Coloring Paint (P2)

A second water-based coloring paint (P2-9) was obtained in the same manner as Production Example 61 except that the formulation and paint solid content concentration ($NV_{P2}$) of Production Example 61 were changed as indicated in Table 8 below.

TABLE 8

| Production Examples | | | 61 | 62 |
|---|---|---|---|---|
| Second water-based coloring paint (P2) | | | P2-8 | P2-9 |
| Deionized water | | | 2400.0 | 2400.0 |
| Thickener | Cellulose nanofiber | Aurovisco | 30.0 | 30.0 |
| Wetting agent | | Dynol604 | 15.0 | 15.0 |

TABLE 8-continued

| Production Examples | | | | 61 | 62 |
|---|---|---|---|---|---|
| Effect pigment dispersion | Effect pigment ($B_{P2}$) | Vapor-deposited aluminum flake pigment | Hydroshine WS3001 | 72.0 | 72.0 |
| | | Aluminum flake pigment | ALPASTE EMR-B6360 | 22.0 | 22.0 |
| | Organic solvent | | Isopropanol | 500.0 | 500.0 |
| | Deionized water | | | 500.0 | 500.0 |
| Black pigment dispersion (X-5) | Carbon black pigment | | RAVEN 5000 ULTRA III BEADS | 2.0 | 2.0 |
| | Binder component ($A_{P2}$) | | Hydroxyl group-containing acrylic resin (B-1) | 4.0 | 4.0 |
| | Deionized water | | | 19.4 | 19.4 |
| Ultraviolet absorber | | | Tinuvin 384 | 8.0 | 8.0 |
| Light stabilizer | | | TINUVIN 292 | 7.0 | 7.0 |
| Binder component ($A_{P2}$) | | | Water-dispersible hydroxyl group-containing acrylic resin (B-3) | 40.0 | 40.0 |
| Organic solvent | | | 2-Ethyl-1-hexanol | 30.0 | 30.0 |
| Deionized water | | | | 300.0 | 16500.0 |
| Paint solid content concentration [%] | | | | 3.2 | 0.9 |
| Total solid content of binder component ($A_{P2}$) [parts by mass] | | | | 44.0 | 44.0 |
| Paint solid content in second water-based coloring paint (P2) [parts by mass] | | | | 200.0 | 200.0 |
| Total solid content of effect pigment ($B_{P2}$) [parts by mass] | | | | 94.0 | 94.0 |
| Content proportion of effect pigment ($B_{P2}$) based on 100 parts by mass of solid content of binder component ($A_{P2}$) [parts by mass] | | | | 213.6 | 213.6 |
| Content proportion of effect pigment ($B_{P2}$) based on paint solid content in second water-based coloring paint (P2) [mass %] | | | | 47.0 | 47.0 |

Preparation of Object to be Coated for Testing

A cationic electrodeposition paint (trade name: "Elecron GT-10", available from Kansai Paint Co., Ltd.) was applied by electrodeposition onto a cold-rolled steel sheet chemically treated with zinc phosphate such that the cured film thickness was 20 μm, the coated steel sheet was heated at 170° C. for 30 minutes to cure the paint, and an object to be coated for testing was prepared.

Preparation of Test Sheet

Example 1

In a coating booth adjusted to have a relatively low-humidity environment (temperature: 23° C., relative humidity: 58% RH), the following coating was performed to form a multilayer coating film.

First, the water-based intermediate paint (PR-1) obtained in Production Example 6 was electrostatically applied to an object to be coated for testing using a rotary atomization type electrostatic applicator such that the film thickness when cured was 20 μm, and the object to be coated for testing was allowed to stand for 3 minutes, then preheated at 80° C. for 3 minutes, and then heated at 140° C. for 30 minutes to cure the intermediate coating film. Next, the first water-based paint (P1-1) obtained in Production Example 24 was electrostatically applied onto the cured intermediate coating film using the rotary atomization type electrostatic applicator such that the film thickness when cured was 12 μm, and the obtained product was left standing for one minute. Next, the second water-based coloring paint (P2-1) obtained in Production Example 53 was electrostatically applied onto the uncured first coating film using the rotary atomization type electrostatic applicator such that the film thickness when cured was 4 μm, the obtained product was left standing for 2 minutes and then preheated at 80° C. for 3 minutes.

Next, "Magiclon KINO-1210 TW" (trade name, available from Kansai Paint Co., Ltd., an acrylic resin-based organic solvent-type clear coat paint containing a carboxyl group-containing resin and an epoxy group-containing resin, hereinafter, which may be referred to as a "clear coat paint (P3-1)") was electrostatically applied onto the uncured second coloring coating film such that the film thickness when cured was 35 μm, the obtained product was left standing for 7 minutes and then preheated at 140° C. for 30 minutes to simultaneously cure the first coating film, the second coloring coating film, and the clear coat coating film, whereby a test sheet was prepared.

Examples 2 to 25 and 28 to 35, and Comparative Examples 1 to 7

Test sheets were produced in the same manner as in Example 1 except that the type and cured film thickness of the water-based intermediate paint, the first water-based paint, the second water-based coloring paint, and the clear coat paint used in Example 1 were changed as indicated in Tables 9 to Tables 13 below.

In Example 35, the film thickness of the cured coating film of the second coloring coating film was calculated from the following equation.

$$x = sc/sg/S * 10000$$

x: Film thickness [μm]

sc: Solid content [g] coated by application sg: Specific gravity of coating film [g/cm$^3$]

S: Evaluated surface area [cm$^2$] of the solid content coated by application

In Comparative Example 7, dripping occurred when the second water-based coloring paint (P2-9) was applied, and therefore the following evaluation was not conducted.

Example 26

In a coating booth adjusted to have a relatively low-humidity environment (temperature: 23° C., relative humidity: 58% RH), the following coating was performed to form a multilayer coating film. First, the water-based intermediate paint (PR-1) obtained in Production Example 6 was electrostatically applied onto the object to be coated for testing using a rotary atomization type electrostatic applicator such that the film thickness when cured was 20 μm, the obtained product was then left standing for 3 minutes, and then preheated at 80° C. for 3 minutes. Next, the first water-based paint (P1-16) obtained in Production Example 39 was electrostatically applied onto the uncured intermediate coating film using the rotary atomization type electrostatic applicator such that the film thickness when cured was 12 μm, and the obtained product was left standing for one minute. Next, the second water-based coloring paint (P2-1) obtained in Production Example 53 was electrostatically applied onto the uncured first coating film using the rotary atomization type electrostatic applicator such that the film thickness when cured was 4 μm, the obtained product was left standing for 2 minutes and then preheated at 80° C. for 3 minutes. Next, the clear coat paint (P3-1) was electrostatically applied onto the uncured second coloring coating film such that the film thickness when cured was 35 μm, and the resulting product was allowed to stand for 7 minutes, and then heated at 140° C. for 30 minutes to cure the intermediate coating film, the first coating film, the second coloring coating film, and the clear coat coating film at one time, whereby a test sheet was prepared.

Example 27

A test sheet was prepared in the same manner as in Example 26 except that the type of the first water-based paint was changed to the first water-based paint (P1-17) obtained in Production Example 40 in Example 26.

[Evaluation Test]

The test sheets obtained in Examples 1 to 35 and Comparative Examples 1 to 7 described above were evaluated through the following test method. The evaluation results are indicated in Table 9 to Table 13 below.

[Test Method]

L*25: The lightness L* (25°) value of each test sheet was measured using "CM-512m3" (trade name, manufactured by Konica Minolta, Inc., multi-angle spectrophotometer). The lightness L* (25°) value represents lightness L* in the L*a*b* color system measured for light in a direction perpendicular to the surface to be measured (light received at an angle of 25° with respect to specular light) among reflected light obtained by emitting standard light D65 from an angle of 25° with respect to an axis perpendicular to the surface to be measured.

Metallic unevenness: Each test sheet was observed by the naked eye, and the degree of occurrence of metallic unevenness was evaluated based on the following criteria. Evaluations of A and B were considered to be passing.

A: Almost no metallic unevenness is observed with extremely excellent coating film appearance.

B: Slight metallic unevenness is observed, but excellent coating film appearance is exhibited.

C: Metallic unevenness was observed, and the coating film appearance was slightly poor.

D: A large amount of metallic unevenness is observed, and the coating film appearance is poor.

Brightness: The brightness of each test sheet was evaluated according to the following criteria based on a flip-flop value calculated by the following equation from a lightness L* (25°) and a lightness L* (75°) measured using "BYK-mac i" (trade name, manufactured by BYK-Chemie GmbH, multi-angle colorimeter). Larger flip-flop values indicate a higher brightness of the coating surface. A and B were regarded as acceptable.

$$\text{Flip-flop value} = L^*25/L^*75$$

L*25 indicates a lightness L* in the L*a*b* color system, measured with regard to light received at an angle of 25° in the direction of measurement light from the specular reflection angle when the measurement light is emitted from an angle of 45° with respect to an axis perpendicular to the surface to be measured, and is measured using the multi-angle colorimeter "BYK-mac i" (trade name, manufactured by BYK-Chemie GmbH).

L*75 indicates a lightness L* in the L*a*b* color system, measured with regard to light received at an angle of 75° in the direction of measurement light from the specular reflection angle when the measurement light is emitted from an angle of 45° with respect to an axis perpendicular to the surface to be measured, and is measured using the multi-angle colorimeter "BYK-mac i" (trade name, manufactured by BYK-Chemie GmbH).

A: The flip-flop value is 3.0 or more.

B: The flip-flop value is 2.8 or more and less than 3.

C: The flip-flop value is 2.6 or more and less than 2.8.

D: The flip-flop value is less than 2.6.

TABLE 9

| | | | Examples | | | | | | | | |
|---|---|---|---|---|---|---|---|---|---|---|---|
| | | | 1 | 2 | 3 | 4 | 5 | 6 | 7 | 8 | 9 |
| Name of water-based intermediate paint | | | PR-1 | PR-1 | PR-1 | PR-1 | PR-1 | PR-1 | PR-1 | PR-1 | PR-1 |
| Cured film thickness [μm] | | | 20 | 20 | 20 | 20 | 20 | 20 | 20 | 20 | 20 |
| Curing of intermediate coating film | | | Present | Present | Present | Present | Present | Present | Present | Present | Present |
| Step (1) | First water-based paint (P1) | No. | P1-1 | P1-2 | P1-3 | P1-4 | P1-5 | P1-6 | P1-7 | P1-8 | P1-9 |
| | | Paint solid content concentration ($NV_{P1}$) [mass %] | 30 | 30 | 30 | 30 | 30 | 30 | 30 | 30 | 30 |
| | | Cured film thickness ($T_{P1}$) [μm] | 12 | 12 | 12 | 12 | 12 | 12 | 12 | 12 | 12 |

TABLE 9-continued

| | | | Examples | | | | | | | | |
|---|---|---|---|---|---|---|---|---|---|---|---|
| | | | 1 | 2 | 3 | 4 | 5 | 6 | 7 | 8 | 9 |
| Step (2) | Second water-based coloring paint (P2) | No. | P2-1 | P2-1 | P2-1 | P2-1 | P2-1 | P2-1 | P2-1 | P2-1 | P2-1 |
| | | Paint solid content concentration ($NV_{P2}$) [mass %] | 14 | 14 | 14 | 14 | 14 | 14 | 14 | 14 | 14 |
| | Cured film thickness ($T_{P2}$) [μm] | | 4 | 4 | 4 | 4 | 4 | 4 | 4 | 4 | 4 |
| Step (3) | Clear coat paint (P3) | No. | P3-1 | P3-1 | P3-1 | P3-1 | P3-1 | P3-1 | P3-1 | P3-1 | P3-1 |
| | Cured film thickness [μm] | | 35 | 35 | 35 | 35 | 35 | 35 | 35 | 35 | 35 |
| Step (4) | Heating temperature [° C.] | | 140 | 140 | 140 | 140 | 140 | 140 | 140 | 140 | 140 |
| | Heating time [min] | | 30 | 30 | 30 | 30 | 30 | 30 | 30 | 30 | 30 |
| | L*25 | | 105 | 105 | 105 | 105 | 105 | 105 | 105 | 105 | 105 |
| Evaluation | Metallic unevenness | | A | B | A | A | B | A | A | B | A |
| | Brightness | | A | A | A | A | A | A | A | A | A |

TABLE 10

| | | | Examples | | | | | | | | |
|---|---|---|---|---|---|---|---|---|---|---|---|
| | | | 10 | 11 | 12 | 13 | 14 | 15 | 16 | 17 | 18 |
| Name of water-based intermediate paint | | | PR-1 | PR-1 | PR-1 | PR-1 | PR-1 | PR-1 | PR-1 | PR-1 | PR-1 |
| Cured film thickness [μm] | | | 20 | 20 | 20 | 20 | 20 | 20 | 25 | 20 | 20 |
| Curing of intermediate coating film | | | Present | Present | Present | Present | Present | Present | Present | Present | Present |
| Step (1) | First water-based paint (P1) | No. | P1-10 | P1-11 | P1-12 | P1-13 | P1-14 | P1-15 | P1-1 | P1-1 | P1-1 |
| | | Paint solid content concentration ($NV_{P1}$) [mass %] | 30 | 30 | 30 | 28 | 32 | 30 | 30 | 30 | 30 |
| | Cured film thickness ($T_{P1}$) [μm] | | 12 | 12 | 12 | 12 | 12 | 12 | 12 | 7 | 10 |
| Step (2) | Second water-based coloring paint (P2) | No. | P2-1 | P2-1 | P2-1 | P2-1 | P2-1 | P2-1 | P2-1 | P2-1 | P2-1 |
| | | Paint solid content concentration ($NV_{P2}$) [mass %] | 14 | 14 | 14 | 14 | 14 | 14 | 14 | 14 | 14 |
| | Cured film thickness ($T_{P2}$) [μm] | | 4 | 4 | 4 | 4 | 4 | 4 | 4 | 4 | 4 |
| Step (3) | Clear coat paint (P3) | No. | P3-1 | P3-1 | P3-1 | P3-1 | P3-1 | P3-1 | P3-1 | P3-1 | P3-1 |
| | Cured film thickness [μm] | | 35 | 35 | 35 | 35 | 35 | 35 | 35 | 35 | 35 |
| Step (4) | Heating temperature [° C.] | | 140 | 140 | 140 | 140 | 140 | 140 | 140 | 140 | 140 |
| | Heating time [min] | | 30 | 30 | 30 | 30 | 30 | 30 | 30 | 30 | 30 |
| | L*25 | | 105 | 105 | 105 | 105 | 105 | 105 | 105 | 105 | 105 |
| Evaluation | Metallic unevenness | | A | A | A | A | A | A | A | B | A |
| | Brightness | | A | B | A | A | A | A | A | A | A |

TABLE 11

| | | | Examples | | | | | | | | |
|---|---|---|---|---|---|---|---|---|---|---|---|
| | | | 19 | 20 | 21 | 22 | 23 | 24 | 25 | 26 | 27 |
| Name of water-based intermediate paint | | | PR-1 | PR-1 | PR-1 | PR-1 | PR-1 | PR-1 | PR-1 | PR-1 | PR-1 |
| Cured film thickness [μm] | | | 20 | 20 | 20 | 20 | 20 | 20 | 20 | 20 | 20 |
| Curing of intermediate coating film | | | Present | Present | Present | Present | Present | Present | Present | None | None |
| Step (1) | First water-based paint (P1) | No. | P1-1 | P1-1 | P1-1 | P1-1 | P1-1 | P1-1 | P1-1 | P1-16 | P1-17 |
| | | Paint solid content concentration ($NV_{P1}$) [mass %] | 30 | 30 | 30 | 30 | 30 | 30 | 30 | 25 | 25 |
| | Cured film thickness ($T_{P1}$) [μm] | | 14 | 17 | 12 | 12 | 12 | 12 | 12 | 12 | 12 |
| Step (2) | Second water-based coloring paint (P2) | No. | P2-1 | P2-1 | P2-2 | P2-3 | P2-4 | P2-5 | P2-1 | P2-1 | P2-1 |
| | | Paint solid content concentration ($NV_{P2}$) [mass %] | 14 | 14 | 7 | 9 | 12 | 16 | 14 | 14 | 14 |
| | Cured film thickness ($T_{P2}$) [μm] | | 4 | 4 | 4 | 4 | 4 | 4 | 4 | 4 | 4 |
| Step (3) | Clear coat paint (P3) | No. | P3-1 | P3-1 | P3-1 | P3-1 | P3-1 | P3-1 | P3-2[1)] | P3-1 | P3-1 |
| | Cured film thickness [μm] | | 35 | 35 | 35 | 35 | 35 | 35 | 35 | 35 | 35 |

TABLE 11-continued

| | | | Examples | | | | | | | | |
|---|---|---|---|---|---|---|---|---|---|---|---|
| | | | 19 | 20 | 21 | 22 | 23 | 24 | 25 | 26 | 27 |
| Step (4) | Heating temperature [° C.] | | 140 | 140 | 140 | 140 | 140 | 140 | 140 | 140 | 140 |
| | Heating time [min] | | 30 | 30 | 30 | 30 | 30 | 30 | 30 | 30 | 30 |
| | L*25 | | 105 | 105 | 110 | 108 | 106 | 104 | 105 | 105 | 105 |
| Evaluation | Metallic unevenness | | A | A | B | A | A | A | A | B | A |
| | Brightness | | A | A | A | A | A | B | A | A | A |

TABLE 12

| | | | Examples | | | | | | | |
|---|---|---|---|---|---|---|---|---|---|---|
| | | | 28 | 29 | 30 | 31 | 32 | 33 | 34 | 35 |
| Name of water-based intermediate paint | | | PR-1 | PR-1 | PR-1 | PR-1 | PR-1 | PR-1 | PR-1 | PR-1 |
| Cured film thickness [μm] | | | 20 | 20 | 20 | 20 | 20 | 20 | 20 | 20 |
| Curing of intermediate coating film | | | Present | Present | Present | Present | Present | Present | Present | Present |
| Step (1) | First water-based paint (P1) | No. | P1-22 | P1-23 | P1-24 | P1-25 | P1-26 | P1-27 | P1-28 | P1-1 |
| | | Paint solid content concentration ($NV_{P1}$) [mass %] | 30 | 30 | 30 | 28 | 32 | 30 | 30 | 30 |
| | Cured film thickness ($T_{P1}$) [μm] | | 12 | 12 | 12 | 12 | 12 | 12 | 12 | 10 |
| Step (2) | Second water-based coloring paint (P2) | No. | P2-7 | P2-7 | P2-7 | P2-7 | P2-7 | P2-7 | P2-7 | P2-8 |
| | | Paint solid content concentration ($NV_{P2}$) [mass %] | 14 | 14 | 14 | 14 | 14 | 14 | 14 | 3.2 |
| | Cured film thickness ($T_{P2}$) [μm] | | 4 | 4 | 4 | 4 | 4 | 4 | 4 | 2 |
| Step (3) | Clear coat paint (P3) | No. | P3-1 | P3-1 | P3-1 | P3-1 | P3-1 | P3-1 | P3-1 | P3-2[1)] |
| | Cured film thickness [μm] | | 35 | 35 | 35 | 35 | 35 | 35 | 35 | 35 |
| Step (4) | Heating temperature [° C.] | | 140 | 140 | 140 | 140 | 140 | 140 | 140 | 140 |
| | Heating time [min] | | 30 | 30 | 30 | 30 | 30 | 30 | 30 | 30 |
| | L*25 | | 64 | 64 | 64 | 64 | 64 | 64 | 64 | 95 |
| Evaluation | Metallic unevenness | | A | A | A | A | A | A | A | A |
| | Brightness | | A | A | A | A | A | A | A | A |

TABLE 13

| | | | Comparative Examples | | | | | | |
|---|---|---|---|---|---|---|---|---|---|
| | | | 1 | 2 | 3 | 4 | 5 | 6 | 7 |
| Name of water-based intermediate paint | | | PR-1 | PR-1 | PR-1 | PR-1 | PR-1 | PR-1 | PR-1 |
| Cured film thickness [μm] | | | 20 | 20 | 20 | 20 | 20 | 20 | 20 |
| Curing of intermediate coating film | | | Present | Present | Present | Present | Present | Present | Present |
| Step (1) | First water-based paint (P1) | No. | P1-18 | P1-19 | P1-20 | P1-21 | P1-29 | P1-1 | P1-1 |
| | | Paint solid content concentration ($NV_{P1}$) [mass %] | 30 | 30 | 30 | 30 | 30 | 30 | 30 |
| | Cured film thickness ($T_{P1}$) [μm] | | 12 | 12 | 12 | 12 | 12 | 12 | 10 |
| Step (2) | Second water-based coloring paint (P2) | No. | P2-1 | P2-1 | P2-1 | P2-1 | P2-7 | P2-6 | P2-9 |
| | | Paint solid content concentration ($NV_{P2}$) [mass %] | 14 | 14 | 14 | 14 | 14 | 21 | 0.9 |
| | Cured film thickness ($T_{P2}$) [μm] | | 4 | 4 | 4 | 4 | 4 | 4 | —[2)] |
| Step (3) | Clear coat paint (P3) | No. | P3-1 | P3-1 | P3-1 | P3-1 | P3-1 | P3-1 | P3-2[1)] |
| | Cured film thickness [μm] | | 35 | 35 | 35 | 35 | 35 | 35 | 35 |
| Step (4) | Heating temperature [° C.] | | 140 | 140 | 140 | 140 | 140 | 140 | 140 |
| | Heating time [min] | | 30 | 30 | 30 | 30 | 30 | 30 | 30 |
| | L*25 | | 105 | 105 | 105 | 105 | 64 | 100 | —[2)] |
| Evaluation | Metallic unevenness | | D | C | C | C | C | A | —[2)] |
| | Brightness | | A | A | A | A | A | D | —[2)] |

[1)]"KINO-6510 T": trade name, available from Kansai Paint Co., Ltd., an acrylic resin-based organic solvent-type clear coat paint containing a hydroxyl group-containing acrylic resin and a polyisocyanate compound
[2)]Not evaluable due to dripping

The invention claimed is:

1. A method for forming a multilayer coating film, the method comprising the following steps (1) to (4):

(1) forming a first coating film having a cured film thickness ($T_{P1}$) in a range of from 5 μm to 20 μm by applying a first water-based paint (P1) onto an object to be coated;

(2) forming a second coloring coating film having a cured film thickness ($T_{P2}$) in a range of from 0.7 μm to 5 μm by applying a second water-based coloring paint (P2) onto the first coating film, the second water-based coloring paint (P2) containing a binder component ($A_{P2}$) and an effect pigment ($B_{P2}$) and having a paint solid content concentration ($NV_{P2}$) in a range of 1 mass % or more and 16 mass % or less;

(3) forming a clear coat coating film by applying a clear coat paint (P3) onto the second coloring coating film; and (4) curing the multilayer coating film including the first coating film, the second coloring coating film, and the clear coat coating film formed in the steps (1) to (3) at one time by heating the multilayer coating film, wherein the first water-based paint (P1) comprises a compound (A) containing a hydroxyl group and an acid group, a film-forming resin (B), and a crosslinking agent (C), the compound (A) containing a hydroxyl group and an acid group having an acid value in a range of from 50 mg KOH/g to 150 mg KOH/g, a hydroxyl value in a range of from 100 mg KOH/g to 300 mg KOH/g, and a weight average molecular weight in a range of from 500 to 8000, and wherein the multilayer coating film has a flip-flop value of 2.8 or more, and wherein the multilayer coating film has an L*25 value in a range of from 75 to 120.

2. The method for forming the multilayer coating film according to claim 1, wherein the object to be coated is a steel sheet on which a cured electrodeposited coating film is formed, on which an intermediate coating paint is applied to form an intermediate coating film.

3. The method for forming the multilayer coating film according to claim 2, wherein the intermediate paint is a water-based paint.

4. The method for forming the multilayer coating film according to claim 2, wherein the intermediate paint has a cured film thickness in a range of from 10 μm to 40 μm.

5. The method for forming the multilayer coating film according to claim 1, wherein the compound (A) containing the hydroxyl group and the acid group comprises a carboxyl group as the acid group.

6. The method for forming the multilayer coating film according to claim 1, wherein the compound (A) containing the hydroxyl group and the acid group comprises an acrylic resin (A1) containing a hydroxyl group and an acid group, the acrylic resin (A1) containing a hydroxyl group and an acid group having an acid value in a range of from 50 mg KOH/g to 140 mg KOH/g, a hydroxyl value in a range of from 100 mg KOH/g to 300 mg KOH/g, and a weight average molecular weight in a range of from 500 to 8000.

7. The method for forming the multilayer coating film according to claim 6, wherein the acrylic resin (A1) containing the hydroxyl group and the acid group has the weight average molecular weight in a range of from 1000 to 8000.

8. The method for forming the multilayer coating film according to claim 1, wherein the second water-based coloring paint (P2) contains the effect pigment ($B_{P2}$) in an amount ranging from 5 parts by mass to 550 parts by mass based on 100 parts by mass of a solid content of the binder component ($A_{P2}$).

9. The method for forming the multilayer coating film according to claim 1, wherein the second water-based coloring paint (P2) contains the effect pigment ($B_{P2}$) in an amount ranging from 4 mass % to 85 mass % based on a paint solid content in the second water-based coloring paint (P2).

* * * * *